(12) United States Patent
Joseph et al.

(10) Patent No.: US 12,238,726 B2
(45) Date of Patent: Feb. 25, 2025

(54) LCP RESTRICTION ENHANCEMENT

(71) Applicant: QUALCOMM Incorporated, San Diego, CA (US)

(72) Inventors: Vinay Joseph, Calicut (IN); Rajat Prakash, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/310,338

(22) Filed: May 1, 2023

(65) Prior Publication Data

US 2023/0269739 A1     Aug. 24, 2023

Related U.S. Application Data

(62) Division of application No. 16/945,329, filed on Jul. 31, 2020, now Pat. No. 11,671,970.
(Continued)

(51) Int. Cl.
H04W 72/21     (2023.01)
H04L 5/00       (2006.01)
(Continued)

(52) U.S. Cl.
CPC .......... H04W 72/21 (2023.01); H04L 5/0048 (2013.01); H04W 28/0278 (2013.01); H04W 76/27 (2018.02)

(58) Field of Classification Search
CPC .............. H04W 72/085; H04W 72/14; H04W 72/1284; H04W 74/0808; H04W 74/08; H04W 72/0446
See application file for complete search history.

(56) References Cited

U.S. PATENT DOCUMENTS

2011/0268087 A1*  11/2011  Kwon ................... H04L 5/0005
                                                           370/328
2015/0181461 A1*  6/2015  Kim .................. H04W 28/0289
                                                           370/236
(Continued)

FOREIGN PATENT DOCUMENTS

CN       108353408 A     7/2018
CN       109314841 A     2/2019
(Continued)

OTHER PUBLICATIONS

ETSI MCC: "Report of 3GPP TSG RAN2#99 Meeting, Berlin, Germany", 3GPP TSG-RAN WG2 meeting #99bis, R2-1710001, Prague, Czech Republic, Oct. 9-13, 2017, pp. 1-235.
(Continued)

Primary Examiner — Yee F Lam
(74) Attorney, Agent, or Firm — Norton Rose Fulbright US LLP

(57) ABSTRACT

Aspects for enhanced logical channel prioritization mapping procedures and restrictions are disclosed. In one aspect, a method of wireless communication includes transmitting, by a network entity, a logical channel prioritization (LCP) restriction configuration for a logical channel indicating a set of Sounding Reference Signal (SRS) configurations associated with the logical channel; determining, by the network entity, data of the logical channel of a particular UE is to be scheduled; transmitting, by the network entity, an uplink grant indicating an uplink grant instance for the particular UE, wherein the uplink grant instance indicates an SRS configuration of the set of SRS configurations; and receiving, by the network entity, a transmission corresponding to the uplink grant instance and including the data of the logical channel. Additional aspects are described.

30 Claims, 11 Drawing Sheets

Related U.S. Application Data

(60) Provisional application No. 62/884,067, filed on Aug. 7, 2019.

(51) Int. Cl.
  *H04W 28/02* (2009.01)
  *H04W 76/27* (2018.01)

(56) References Cited

U.S. PATENT DOCUMENTS

| | | | | |
|---|---|---|---|---|
| 2015/0358920 | A1* | 12/2015 | Sorrentino | H04W 52/228 |
| | | | | 455/522 |
| 2018/0048498 | A1* | 2/2018 | Stern-Berkowitz | H04L 5/0091 |
| 2018/0279262 | A1 | 9/2018 | Babaei et al. | |
| 2018/0368132 | A1 | 12/2018 | Babaei et al. | |
| 2019/0014596 | A1* | 1/2019 | Yang | H04W 72/21 |
| 2019/0044681 | A1* | 2/2019 | Zhang | H04L 5/0094 |
| 2019/0075014 | A1* | 3/2019 | Zhou | H04W 74/0833 |
| 2019/0124538 | A1* | 4/2019 | Tang | H04B 7/0632 |
| 2019/0174466 | A1* | 6/2019 | Zhang | H04L 5/0057 |
| 2020/0221405 | A1* | 7/2020 | Zarifi | H04W 52/50 |
| 2021/0045142 | A1 | 2/2021 | Joseph et al. | |
| 2021/0227484 | A1* | 7/2021 | Zarifi | H04W 56/0045 |

FOREIGN PATENT DOCUMENTS

| | | |
|---|---|---|
| CN | 109756986 A | 5/2019 |
| WO | WO-2016123402 A1 | 8/2016 |
| WO | WO-2018053359 A1 | 3/2018 |
| WO | WO-2019017707 A1 | 1/2019 |
| WO | WO-2019072364 A1 | 4/2019 |
| WO | WO-2019095328 A1 | 5/2019 |

OTHER PUBLICATIONS

International Search Report and Written Opinion—PCT/US2020/044698—ISA/EPO—Nov. 9, 2020 (194096WO).
International Preliminary Report on Patentability—PCT/US2020/044698, The International Bureau of WIPO—Geneva, Switzerland, Feb. 17, 2022 (194096WO).

* cited by examiner

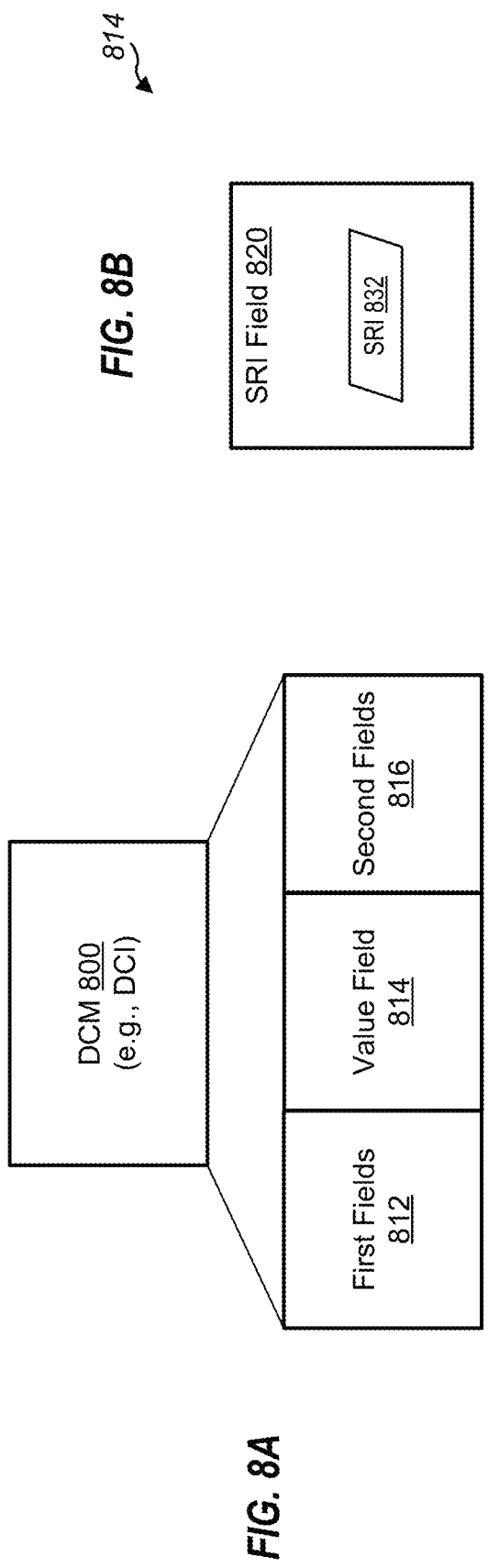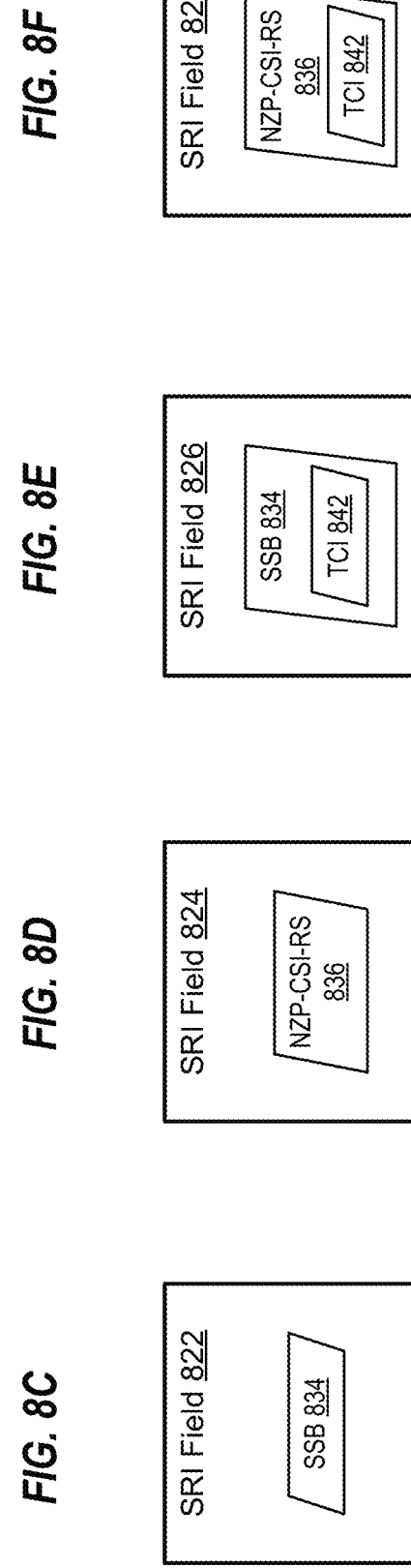

LCP RESTRICTION ENHANCEMENT

CROSS-REFERENCE TO RELATED APPLICATIONS

This application is a divisional of U.S. patent application Ser. No. 16/945,329, entitled, "LCP RESTRICTION ENHANCEMENT," filed on Jul. 31, 2020, and also claims the benefit of U.S. Provisional Patent Application No. 62/884,067, entitled, "LCP RESTRICTION ENHANCEMENT," filed on Aug. 7, 2019, which is expressly incorporated by reference herein in its entirety.

BACKGROUND

Field

Aspects of the present disclosure relate generally to wireless communication systems, and more particularly, to logical channel prioritization (LCP) enhancements, such as for multiple transmission reception point (TRP) modes.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The described techniques relate to improved methods, systems, devices, and apparatuses that support enhanced logical channel prioritization mapping procedures and restrictions, such as SRS/SRI (Sounding Reference Signal (SRS)/SRS Resource Indicator (SRI)) based indication of logical channel prioritization (LCP) restrictions. Such enhanced LCP mapping procedures may enable operation in multiple TRP modes and/or mapping duplicate data for transmission via the same carrier. Accordingly, such techniques may increase reliability and reduce latency and enable operation in URLLC modes.

In one aspect of the disclosure, a method of wireless communication includes receiving, by a user equipment (UE), a logical channel prioritization (LCP) restriction configuration for a logical channel indicating a set of SRS configurations associated with the logical channel; receiving, by the UE, an uplink grant indicating an uplink grant instance and an SRS configuration for the uplink grant instance; and selecting, by the UE, the logical channel to use resources of the uplink grant instance based in part on the set of SRS configurations and the SRS configuration for the uplink grant instance.

In an additional aspect of the disclosure, an apparatus configured for wireless communication is disclosed. The apparatus includes at least one processor, and a memory coupled to the processor. The processor is configured to receive, by a user equipment (UE), a logical channel prioritization (LCP) restriction configuration for a logical channel indicating a set of SRS configurations associated with the logical channel; receive, by the UE, an uplink grant indicating an uplink grant instance and an SRS configuration for the uplink grant instance; and select, by the UE, the logical channel to use resources of the uplink grant instance based in part on the set of SRS configurations and the SRS configuration for the uplink grant instance.

In another aspect of the disclosure, a method of wireless communication includes transmitting, by a network entity, a logical channel prioritization (LCP) restriction configuration for a logical channel indicating a set of SRS configurations associated with the logical channel; determining, by the network entity, data of the logical channel of a particular UE is to be scheduled; transmitting, by the network entity, an uplink grant indicating an uplink grant instance for the particular user device and an SRS configuration of the set of SRS configurations; and receiving, by the network entity, a transmission corresponding to the uplink grant instance and including the data of the logical channel.

In an additional aspect of the disclosure, an apparatus configured for wireless communication is disclosed. The apparatus includes at least one processor, and a memory coupled to the processor. The processor is configured to transmit, by a network entity, a logical channel prioritization (LCP) restriction configuration for a logical channel indicating a set of SRS configurations associated with the logical channel; determine, by the network entity, data of the logical channel of a particular UE is to be scheduled; transmit, by the network entity, an uplink grant indicating an uplink grant instance for the particular user device and an SRS configuration of the set of SRS configurations; and receive, by the network entity, a transmission corresponding to the uplink grant instance and including the data of the logical channel.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 8A-8F are each a schematic diagram illustrating an example of downlink control message including fields thereof.

DETAILED DESCRIPTION

Figure 1:
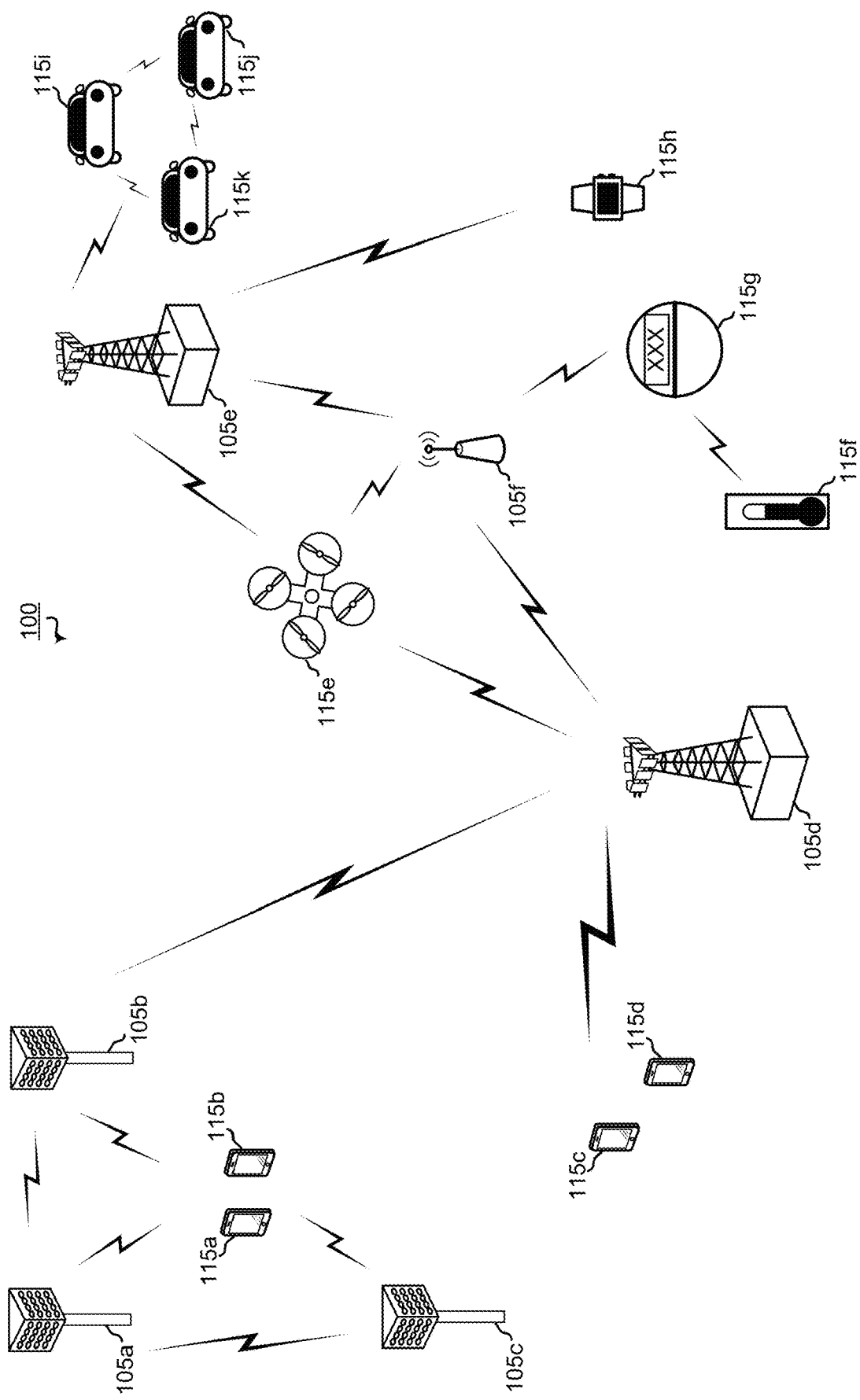
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The detailed description is related to logical channel prioritization (LCP) enhancements. Conventionally, LCP is used by a UE to select a logical channel for uplink data. When operating in some multiple transmission reception point (TRP) modes, the UE may send data to different TRPs which have spatial diversity (e.g., have different positions due to different antenna equipment). The UE may send duplicate data to increase throughput and reliability, such as to enable operation in URLLC modes. Because the data is duplicated, the LCP mapping restrictions are unable to schedule and transmit copies/duplicates of date via the same carrier. To illustrate, in conventional operations, when the UE is attempting to map the duplicated data (e.g., two copies of the same data) to separate logical channels for subsequent scheduling via uplink grants, no mapping criteria is available to enable proper selection of logical channels for proper transmission. For example, the UE cannot send the duplicated data via the logical channels because there may be no indication of transmission parameters (e.g., different transmission parameters) such that the two transmission can be successfully transmitted via the same carrier to two different TRPs. Thus, the UE uses different carriers to send the duplicate data in such instances. Such procedures may not achieve low latency requirements or constraints for some operating modes, such as URLLC, (e.g., eURLLC).

The described techniques relate to improved methods, systems, devices, and apparatuses that support enhanced logical channel prioritization mapping procedures and restrictions, such as SRS/SRI (Sounding Reference Signal (SRS)/SRS Resource Indicator (SRI)) based indication of logical channel prioritization (LCP) restrictions. Such enhanced LCP mapping procedures may enable operation in multiple TRP modes and/or mapping duplicate data for transmission via the same carrier. Accordingly, such techniques may increase reliability and reduce latency and enable operation in URLLC modes.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
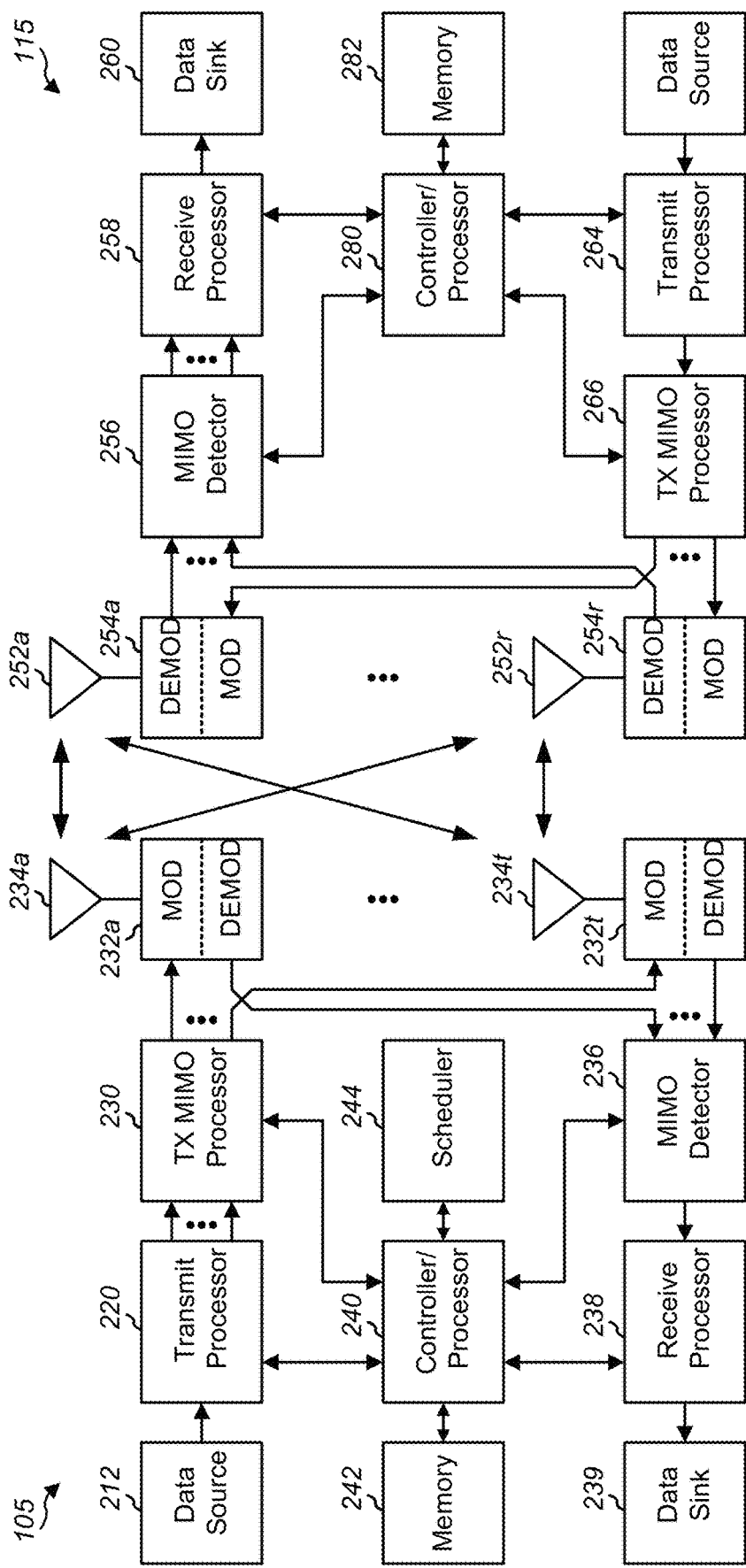
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 9 and 10, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5G network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, or a 25-µs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
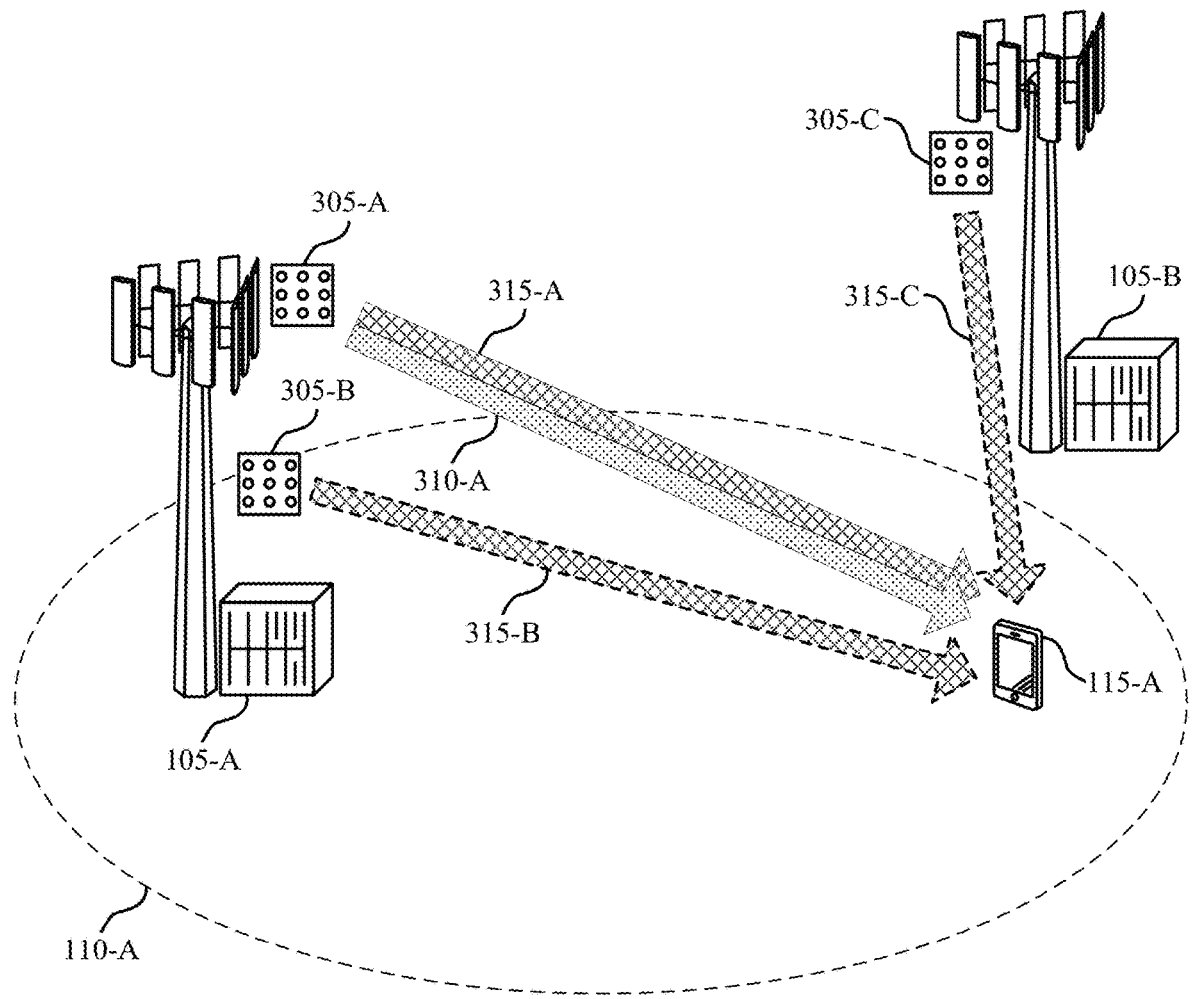
FIG. 3 is a diagram illustrating an example of a wireless communication system that multi-transmission/reception point (TRP) schemes in accordance with aspects of the present disclosure

FIG. 3 illustrates an example of a wireless communications system 300 that supports dynamic switching between different multi-TRP schemes in accordance with aspects of the present disclosure. In some examples, wireless communications system 300 may implement aspects of wireless communication system 100. For example, wireless communications system 300 may include multiple UEs 115 and base stations 105. The base stations 105 may communicate with the UEs 115 using TRPs 305. Each base station 105 may have one or more TRPs 305. For example, base station 105-a may include TRP 305-a and TRP 305-b, while base station 105-b may include TRP 305-c. UE 115-a may communicate with the network using a single TRP 305, using multiple TRPs 305 corresponding to a single base station 105 (e.g., TRPs 305-a and 305-b at base station 105-a), or using multiple TRPs 305 corresponding to multiple different base stations 105 (e.g., TRP 305-a at base station 105-a and TRP 305-c at base station 105-b, where base stations 105-a and 105-b may be connected via a backhaul connection).

In a communication scheme that includes multiple TRPs 305, a single DCI message may configure the communications for the multiple TRPs 305. In an example, base station 105-a may communicate using a first TRP 305-a and a second TRP 305-b. Base station 105-a may transmit DCI using TRP 305-a on a PDCCH 310-a to UE 115-a. The DCI may include communication configuration information for the TCI state(s). The TCI state(s) may determine whether the communications correspond to single TRP communication or multiple TRP communication. The TCI state(s) may also indicate the type of communication scheme (e.g., TDM, FDM, SDM, etc.) configured for the communication. If the TCI configuration is one TCI state, the one TCI state may correspond to single TRP communication. If the TCI configuration is multiple TCI states, the multiple TCI states may correspond to communication with multiple TRPs. In some cases, the wireless communications system 300 may support up to M candidate TCI states for the purpose of quasi-co-location (QCL) indication. Of these M candidates (e.g., 128 candidate TCI states), a subset of TCI states may be determined based on a medium access control (MAC) control element (CE). The MAC-CE may correspond to a certain number (e.g., $2^N$, such as 8 TCI states) of candidate TCI states for PDSCH QCL indication. One of these $2^N$ TCI states can be dynamically indicated in a message (e.g., DCI) using N bits.

The DCI on the PDCCH 310-a may schedule PDSCH 315-a transmissions from TRP 305-a for single TRP communication configurations. Alternatively, the DCI on the PDCCH 310-a may schedule multiple PDSCH 315 transmissions from multiple TRPs 305. For example, the DCI may schedule PDSCH 315-a transmissions from TRP 305-a and PDSCH 315-b transmissions from TRP 305-b or PDSCH 315-a transmissions from TRP 305-a and PDSCH 315-c transmission from TRP 305-c for multiple TRP communication configurations. A UE 115 may be configured with a list of different candidate TCI states for the purpose of QCL indication. The QCL indication may also indicate DMRS in the DCI corresponding to the PDSCH 315. Each TCI code point in a DCI may correspond to one or more QCL relationships (e.g., corresponding to one or more reference signal (RS) sets) and, accordingly, one or more TCI states.

In cases where the network communicates with a UE 115 with TRPs 305, whether in a single TRP configuration or a multiple TRP configuration, there may be multiple different schemes with which to communicate with the TRP(s) 305. The TRP communication scheme may be determined by the TCI states. The TCI state(s) for communication on the PDSCH 315 may be indicated in the DCI by one or more bits, where the one or more bits indicate a TCI code point. The TCI code point in the DCI can correspond to one or more TCI states (e.g., either one or two TCI states). If the TCI code point in the DCI indicates one TCI state, the UE 115 is configured for single TRP operation. If the TCI code point in the DCI indicates two TCI states (and, correspondingly, two QCL relationships), the UE 115 is configured for multiple TRP operation. For example, if two TCI states are active within a TCI code point, each TCI state may correspond to one code division multiplexing (CDM) group.

In a first example multi-TRP scheme, TRPs 305 may communicate by utilizing SDM. In this case, different spatial layers may be transmitted from different TRPs 305 on the same RBs and symbols. Each TCI state may also correspond to different DMRS port groups. The DMRS ports in a DMRS CDM port group may be QCLed. This may allow a UE 115 to estimate each channel separately. In SDM, each antenna port used on the downlink may belong to a different CDM group. Base station 105-a may indicate the antenna port groups using an antenna port(s) field in DCI.

The SDM scheme may include different TCI states within a single slot, where the TCI states overlap in time, frequency, or both. Different groups of spatial layers (which may correspond to different TCI states) may use the same modulation order. Cases where multiple groups use the same modulation order may be signaled through the modulation and coding scheme (MCS). In some cases, base station 105-a may indicate the MCS in the DCI. In cases where the different groups of spatial layers use different modulation orders, each of the different modulation orders may be signaled to UE 115-a. Different DMRS port groups may correspond to different TRPs, QCL relationships, TCI states, or a combination thereof.

In other examples of multi-TRP schemes, TRPs 305 may communicate with UE 115-a by utilizing FDM and/or TDM communication schemes. In an FDM scheme, one set of RBs or a set of PRGs may correspond to a first TRP 305-a and a first TCI state, and a second set of RBs or PRGs may correspond to a second TRP 305-b and a second TCI state. The RBs allocated for each TRP may be distinct from each other, so that each TRP communicates on a designated set of RBs that are distinct form the other set of RBs (but may overlap in the same OFDM symbol). The frequency domain resource assignment field in the DCI may indicate both the first set and the second set or RBs or PRGs. In some cases, base station 105-a may use additional signaling in the DCI to indicate which RBs belong to the first set and which belong to the second set. In some cases, the system may support a limited number of possibilities for allocating the frequency resources to the different TRPs (e.g., to reduce the overhead).

In a TDM scheme, a similar table of possibilities may be used to signal the resource allocation for different TRPs. In this case, each TRP is allocated to different sets of OFDM symbols rather than to different sets of RBs. Such a TDM scheme may support TDMed transmissions within a single slot (e.g., transmission time interval (TTI)). In some cases, a TDM scheme may implement slot aggregation, where transmissions using different TCI states may be spread across different slots (e.g., TTIs). In slot aggregation, the transmissions over the different TRPs may use separate rate matching, but may have the same or different modulation orders.

The network may communicate with UE 115-a using multiple TRPs and any of the communication schemes described herein. Further, some communication schemes may include a combination of TDM and FDM, or cases where TDM may or may not be in a slot aggregation configuration. The schemes may also include some cases where rate matching is joint and some cases where rate matching is separate for different TRPs, and the schemes may also include cases where the different TRPs have the same or different modulation orders. Each scheme may also utilize different parameters that are included in signaling, such as which DMRS ports are used (e.g., for an SDM scheme) or how RBs are split up (e.g., for an FDM scheme).

To efficiently configure UE 115-a with the TCI state information—and the corresponding TRP scheme—base station 105-a may generate bits for a DCI message and may transmit the DCI on PDCCH 310-a. The DCI message may be transmitted to UE 115-a using TRP 305-a. UE 115-a may determine which scheme is configured for communication with TRPs 305 based on one or more fields of the received DCI. The DCI may be the same size across all communication schemes, and the formatting (e.g., number of bits) of DCI fields may remain the same across the communication schemes.

In a first implementation, UE 115-a may detect the communication scheme based on the antenna port(s) field and the TCI field of the received DCI message. The TCI field of the DCI may signify whether communication with one TRP using one TCI state is configured (e.g., TRP 305-a) or communication with multiple TRPs using multiple TCI states is configured (e.g., TRP 305-a and TRP 305-b). For example, a value (e.g., tci-PresentInDCI) in the TCI field may not be configured for the CORESET scheduling the PDSCH, or the value may correspond to one TCI state. The MAC-CE may configure the TCI state possibilities, and the TCI state field of the DCI may indicate the possibility based on the configuration by the MAC-CE. Different values in the TCI state field may correspond to either single TRP communication (e.g., communication with TRP 305-a if a single TCI state is indicated) or multiple TRP communication (e.g., communication with TRPs 305-a and 305-b, 305-a and 305-c, etc. if two TCI states are indicated).

UE 115-a may determine whether the DCI indicates a single TRP communication scheme or a multiple TRP communication scheme based on the value in the TCI field and may interpret the value in the antenna port(s) field of the DCI based on the TCI field value. In cases where the TCI field corresponds to a communication scheme with a single TRP 305, such as TRP 305-a, the UE 115-a may identify the value of the antenna port(s) field for a single TCI state. Based on a table in memory, UE 115-a may determine one or more antenna ports for the scheduled PDSCH 315-a transmission based on the antenna port(s) field value. In cases where the TCI field corresponds to a communication scheme with multiple TRPs 305, such as TRP 305-a and TRP 305-b, the UE 115-a may identify the value of the antenna port(s) field and determine a multi-TRP scheme based on the value. In an example, the antenna port(s) field value may correspond to one or more DMRS ports, a communication scheme, a rate matching configuration, scheme-specific parameters, or some combination of these.

In a second implementation, the UE 115-a may determine the communication scheme based on a field explicitly indicating the scheme in a DCI message (e.g., a multi-TCI-scheme field). The value in the multi-TCI scheme field may correspond to a specific multi-TCI scheme (e.g., SDM, FDM, or TDM). If the value in the multi-TCI scheme field corresponds to a TDM scheme, the value may additionally indicate if the TDM scheme is configured for one slot or for multiple slots based on a slot aggregation procedure.

In one example, the UE 115-a may identify a value for the TCI field in the DCI message and may determine whether the communication scheme includes multiple TCI states based on the TCI field value. If the value does not correspond to multiple TCI states, then the UE 115-a may ignore (e.g., not process) the multi-TCI state field. In some cases, the value of the multi-TCI scheme field may only be relevant in cases where the TCI field in the DCI corresponds to more than one TCI state.

In a second example, the UE 115-a may determine whether the communication scheme includes multiple TCI states based on the multi-TCI state field. For example, a particular value of the multi-TCI state field may correspond to a single TCI state, while the other values may correspond to different multiple TCI scheme possibilities. In this example, the UE 115-a may interpret the TCI field based on whether the multi-TCI state field indicates single or multiple TRP operation. For example, the same TCI code point in the TCI field may correspond to either one TCI state or a pair of TCI states based on whether the multi-TCI state field indicates single or multiple TRP operation. In this way, a three-bit TCI field may support eight different single TCI state options and eight different pairs for multiple TCI state options.

The UE 115-a may interpret the value received in the multi-TCI state field based on a table. For example, the value may indicate a certain TRP communication scheme, a rate matching configuration, one or more scheme specific parameters, a modulation order, or any combination of these.

In some cases, different modulation orders are used in different TCI states. The table referenced above may include an additional or alternative column indicating a modulation order for the second TCI state in a multi-TCI scheme. This modulation order value may be an absolute modulation order or may be a relative modulation order with respect to modulation order for the first TCI state in the multi-TCI scheme.

In some cases, the UE 115-a may interpret the antenna port(s) field in the DCI message based on the multi-TCI scheme field. In some examples, UE 115-a may determine based on the two fields that a single TRP configuration is used, or that a multiple TRP configuration with TDM or FDM is used. In these examples, UE 115-a may determine the antenna ports scheme based on a table supporting a single TCI state (or based on no SDM). In other examples, UE 115-a may determine that a multiple TRP configuration with SDM is used. In these other examples, UE 115-a may determine the antenna ports scheme based on a table supporting multiple antenna ports for multiple TCI states.

In other cases, the UE 115-a may use both the antenna port(s) field and the multi-TCI scheme field to determine the communication scheme. For example, UE 115-a may determine whether the multi-TCI scheme is an SDM scheme based on the antenna port(s) field. If not, UE 115-a may determine whether the multi-TCI scheme is an FDM or TDM scheme based on the multi-TCI scheme field.

In a third implementation, the UE 115-*a* may determine RVs for the PDSCH 315 transmissions based on the DCI. For example, base station 105-*a* may identify a transport block for transmission to UE 115-*a*. Base station 105-*a* may encode the transport block and transmit coded bits using TRP 305-*a* and TRP 305-*b*. If base station 105-*a* performs joint rate matching, the coded bits for both TCI states may be the same, corresponding to one RV. If base station 105-*a* performs separate rate matching, the coded bits for each TCI state may be different, corresponding to two different RVs. Base station 105-*a* may indicate the one or more RVs in the single DCI message on the PDCCH 310-*a*. If indicating one RV (e.g., for a single TCI operation or when performing joint rate matching), base station 105-*a* may indicate the one RV in an RV field in the DCI. If indicating multiple (e.g., two) RVs, base station 105-*a* may indicate a pair of RVs in one or more DCI fields.

In a first example, a first RV may be indicated in the RV field of the DCI and a second RV may be indicated in another field in the DCI. For example, the second RV may be indicated in the antenna port(s) field of the DCI, the multi-TCI scheme field of the DCI, or some combination of these.

In a second example, the antenna port(s) field or the multi-TCI scheme field of the DCI as described herein may indicate a rate matching configuration. If the UE 115-*a* determines that the base station 105-*a* performed separate rate matching, the UE 115-*a* may interpret the value in the RV field to indicate separate RV values for the different TCI states. For example, the value of the RV field may correspond to an RV pair, where the first RV value in the pair may correspond to a first TCI state and the second RV value in the pair may correspond to a second TCI state. The value-to-RV pair correspondence may be specified in a table (e.g., a lookup table). This table may be pre-configured in memory at the UE 115-*a* and base station 105-*a*, or the network may configure UE 115-*a* with the table.

In a third example, the rate matching configuration may also be indicated in the RV field. For example, the value of the RV field may correspond to either a single RV or multiple RVs, as shown in the example RV table below. In some cases, UE 115-*a* may use this table to interpret the RV field when determining that a multi-TRP scheme is configured. This table may be specified as a lookup table and may be pre-configured or dynamically configured by the network. If the value of the RV field corresponds to a single RV value for multi-TRP operation, UE 115-*a* may determine that the base station 105-*a* is performing joint rate matching. If the value of the RV field corresponds to a pair of RV values for multi-TRP operation, UE 115-*a* may determine that the base station 105-*a* is performing separate rate matching.

In a fourth implementation, the UE 115-*a* may determine how to interpret an indication of PRG size in the DCI based on the configured multi-TRP scheme. If the UE 115-*a* determines that the multi-TCI scheme is an FDM scheme (e.g., based on either the antenna port(s) field or the multi-TCI field), then the UE 115-*a* may interpret the PRB bundling size indicator field in the DCI per TCI state, as opposed to per bandwidth part. For example, if the PRB bundling size indicator field indicates wideband precoding, the wideband precoding configuration may include wideband communication only within RBs associated with a same TCI state.

It is to be understood that wireless communications system 300 may implement any combination of the implementations described herein to dynamically signal the TCI states for a selected multi-TRP scheme in a single DCI message.

Figure 4:
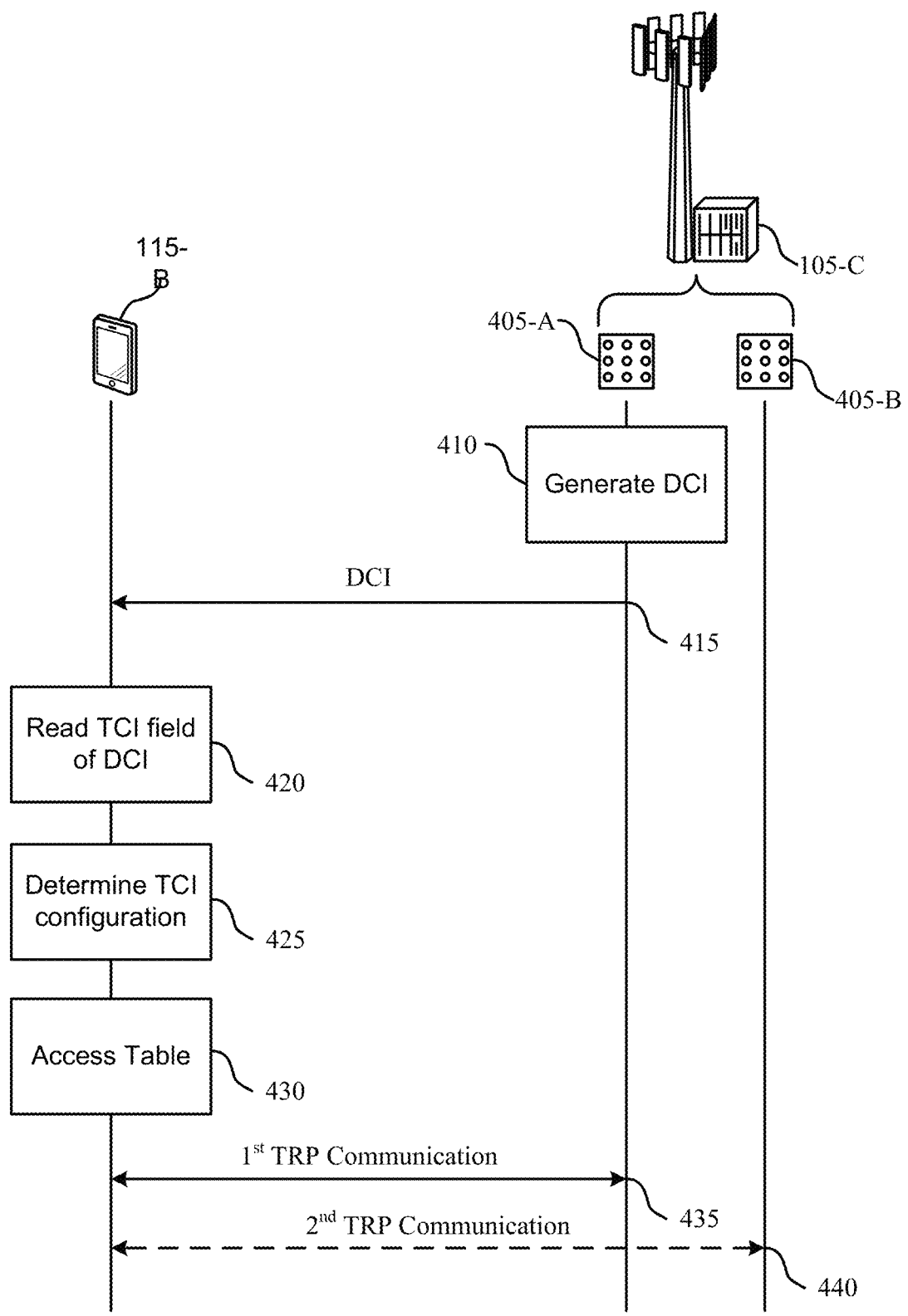
FIG. 4 is a block diagram illustrating an example of a process flow that support dynamic switching between different multi-TRP schemes in accordance with aspects of the present disclosure.

FIG. 4 illustrates an example of a process flow 400 that supports dynamic switching between different multi-TRP schemes in accordance with aspects of the present disclosure. In some examples, process flow 400 may implement aspects of a wireless communications system 100 or 300. For example, a base station 105 and UE 115, such as base station 105-*c* and UE 115-*b*, may perform one or more of the processes described with reference to process flow 400. Base station 105-*c* may communicate with UE 115-*b* by transmitting and receiving signals through TRPs 405-*a* and 405-*b*. In other cases, TRPs 405-*a* and 405-*b* may correspond to different base stations 105. Alternative examples of the following may be implemented, where some steps are performed in a different order than described or are not performed at all. In some cases, steps may include additional features not mentioned below, or further steps may be added.

At 410, base station 105-*c* may generate DCI. The generation may include generating a first set of bits (e.g., a TCI field) that may indicate a set of TCI states for communication with UE 115-*b*. The generation may also include generating a second set of bits (e.g., an antenna port(s) field) that may indicate a set of antenna ports and, in some cases, a multi-TRP communication scheme for multiple TRP communication operation. In some cases, the second set of bits may additionally indicate a modulation order for at least one TCI state (e.g., a second TCI state for TRP 405-*b*), an RV for a TB for at least one TCI state (e.g., the second TCI state for TRP 405-*b*), or a combination thereof.

At 415, base station 105-*c* may transmit the generated DCI to UE 115-*b*. UE 115-*b* may receive the DCI from base station 105-*c*. The DCI may be transmitted on a PDCCH from TRP 405-*a*. The DCI may schedule upcoming PDSCH transmissions and may include other control information. The DCI may include an indication of the first set of bits and the second set of bits. For example, the DCI may include coded bits based on the first set of bits and the second set of bits.

At 420, UE 115-*b* may read the TCI field (e.g., the first set of bits) received in the DCI message. UE 115-*b* may identify, using the first set of bits, one or more TCI states for communication with base station 105-*c* using one or more TRPs 405.

At 425, UE 115-*b* may determine the TCI state configuration based on reading the TCI field of the DCI. For example, a value (e.g., tci-PresentInDCI) in the TCI field may not be configured for the CORESET scheduling the PDSCH, or the value may correspond to one TCI state. In these cases, the communication scheme may be configured for one TRP. In other cases, the TCI field value may correspond to more than one TCI state. In these other cases, the communication may be configured for communication with multiple TRPs.

UE 115-*b* may read the antenna port(s) field of the DCI and may interpret the value of the field based on the determined TCI state configuration. For example, if UE 115-*b* determines that the TCI field indicates a single TCI state, UE 115-*b* may identify, using the second set of bits, a set of antenna ports for the PDSCH transmission. At 430, UE 115-*b* may access a table (e.g., pre-configured in memory or configured by the network) to determine one or more antenna ports corresponding to the antenna port(s) field value.

Alternatively, if UE 115-*b* determines that the TCI field indicates multiple TCI states, UE 115-*b* may identify, using the second set of bits, a set of antenna ports and a multi-TRP communication scheme based on identifying the set of TCI states. The second set of bits may include the same number of bits whether the field indicates just the set of antenna ports for single TRP operation or the set of antenna ports and the multi-TRP scheme for multi-TRP operation. At 430, UE 115-*b* may access a lookup table to determine the set of antenna ports and multi-TRP scheme based on the antenna port(s) field value. In some cases, UE 115-*b* may select the lookup table from a set of lookup tables, where the set may include one lookup table to use for single TRP operation and one lookup table to use for multiple TRP operation.

The lookup table may include information mapping both the set of antenna ports and the multiple TRP scheme to the second set of bits. In some cases, the lookup table mapping both the set of antenna ports and the multiple TRP communication scheme to the second set of bits may be preconfigured in memory, and in some cases it may be dynamically configured by base station 105-*c*. UE 115-*b* may identify the second set of antenna ports and multiple TRP schemes based on the selected lookup table. In the lookup table for multi-TRP operation, along with indications of the DMRS ports, the table may include indications of the multiple TRP scheme (e.g., SDM, FDM, TDM, or some combination thereof). The antenna port(s) field lookup table may indicate that a value in the antenna port(s) field of the DCI corresponds to a set of DMRS ports, where the set of DMRS ports further corresponds to a communication scheme, such as SDM or FDM. The antenna port(s) field value may also indicate if rate matching is joint or separate. If the antenna port(s) field value indicates the use of an FDM communication scheme, the table may additionally indicate an RB configuration for the FDMed TCI states, as shown in the "Possibility" column of the table below. If the lookup tables are configurable by the network, then the network may define the sets of possible DMRS ports and the type of schemes using radio resource control (RRC) signaling.

In some cases, UE 115-*b* may identify, using the second set of bits, a modulation order for at least one TCI state of the set of possible TCI states. Different modulation orders may also be used across different TCI states. A first modulation order may be indicated in a modulation order field. The first modulation order may correspond to a first TCI state in a multi-TRP operation. A second modulation order may be indicated in one of the tables above based on the received value for the antenna port(s) field. For example, a column in the antenna port(s) field lookup table may indicates if the modulation order corresponding to the second TCI state is the same as the modulation order indicated in the MCS (i.e., the modulation order for the first TCI state). If the modulation order is not the same as the modulation order indicated in the MCS, then the value of the modulation order for the second TCI state may be indicated in the antenna port(s) field. The value of the modulation order may be an absolute value or may be a relative value with respect to the first modulation order.

If the TCI state configuration is determined to indicate communication with a single TRP, then UE 115-*b* may send or receive a transmission from one TRP 405-*a* at 435. UE 115-*b* may communicate with the single TRP 405-*a* based on the determined communication scheme. In some aspects, sending to a TRP may involve using transmission configuration parameters (e.g., beam, spatial filter configuration) suited for reception using the TRP.

If the TCI state configuration is determined to indicate communication with multiple TRPs 405, UE 115-*b* may send or receive a transmission from one TRP 405-*a* at 435 and may also send or receive a transmission from another TRP 405-*b* at 440 (where, in some cases, 435 and 440 may correspond to a same time or OFDM symbol). UE 115-*b* may communicate with the network via the multiple configured TRPs 405 based on the determined communication scheme. In some aspects, sending to a set of TRPs may involve using transmission configuration parameters (e.g., beam, spatial filter configuration) suited for reception using the set of TRPs.

Systems and methods described herein are directed to enhanced LCP mapping restrictions such that a UE has enhanced functionality. The enhanced functionality may enable operation in multi-TRP modes and/or duplication of data (e.g., PDCP PDUs). In a particular implementation, the systems and methods described herein enable PDCP PDU duplications to be sent to different TRPs using the same carrier. Accordingly, such systems and methods can be utilized for URLLC and/or Multiple TRP modes.

Figure 5B:
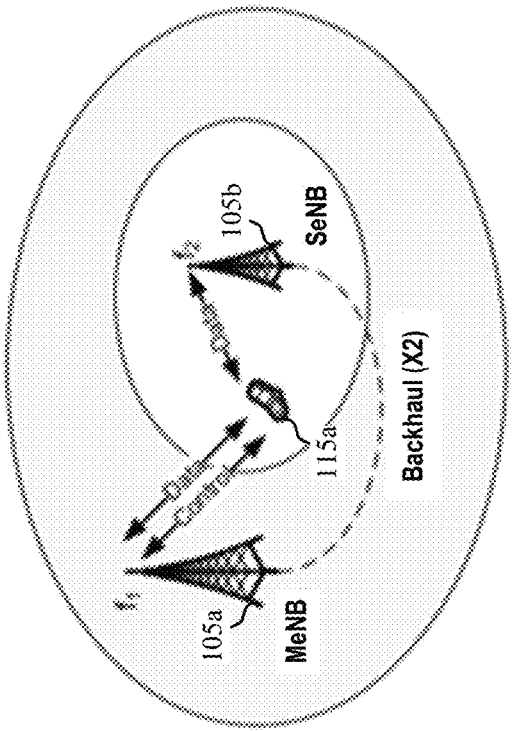
FIGS. 5A-5D are diagrams illustrating different multi-TRP schemes and corresponding PDCP PDU duplication for the different multi-TRP schemes in accordance with aspects of the present disclosure.
Figure 5A:
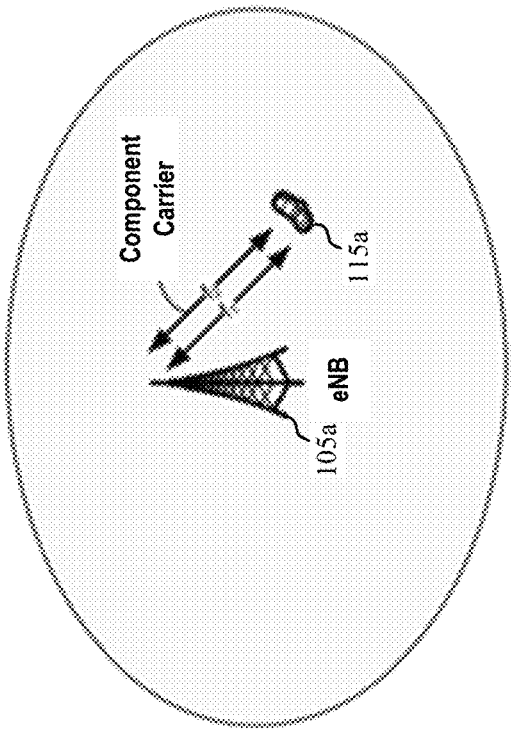
Figure 5D:
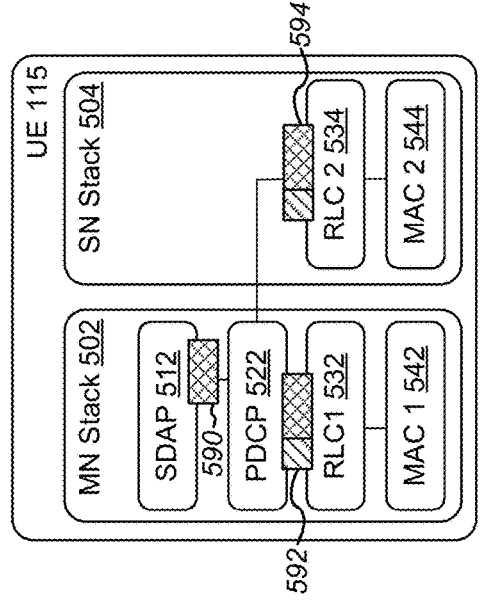
Figure 5C:
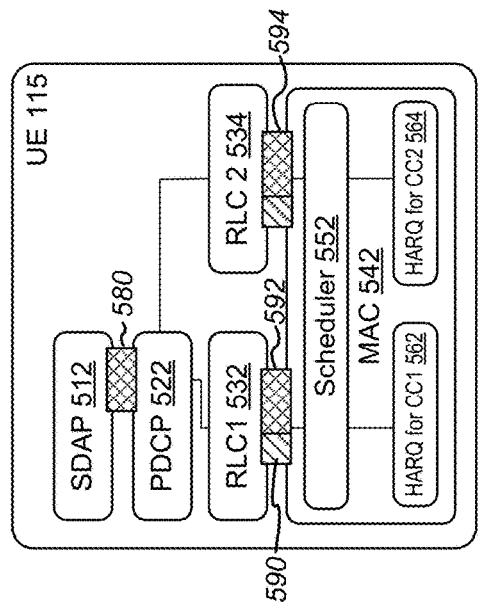

Referring to FIGS. 5A-5D, examples of duplication for different multiple TRP modes are illustrated. FIGS. 5A and 5C correspond to diagrams for carrier aggregation multiple TRP modes and FIGS. 5B and 5D correspond to diagrams for dual connectivity multiple TRP modes. In FIG. 5A, a diagram illustrating carrier aggregation is illustrated. FIG. 5A depicts one base station 105*a* which communicates with UE 115*a*. Base station 105*a* may transmit data and control information; base station 105 may transmit (and receive) information using different equipment and/or settings (e.g., different frequencies). In FIG. 5B, a diagram illustrating dual connectivity is illustrated. FIG. 5B depicts two base stations, 105*a* and 105*b* which communicate with UE 115*a*. UE 115*a* communicates data with both base stations and control information with one base station, main base station 105*a*.

FIGS. 5C and 5D depict block diagrams of a UE stack. The UE stack (e.g., user plane protocol stack) includes a Service Data Adaptation Protocol (SDAP) layer, a Packet Data Convergence Protocol (PDCP) layer, a Radio Link Control (RLC) layer, a Medium Access Control (MAC) layer, and a Physical (PHY) layer. The SDAP layer is configured to provide a mapping between QoS flow and a data radio bearer, marking QoS Flow ID (QFI) in both uplink and downlink. A single SDAP (e.g., single SDAP entity) may be configured for each Protocol Data Unit (PDU) session in some schemes. In Dual Connective (DC), two SDAP entities may be configured, such as two stacks.

The PDCP layer is configured to perform services and functions that include sequence numbering, transfer of user data, reordering and duplicate detection, PDCP PDU routing (e.g., for split bearers), retransmission of PDCP SDUs, and duplication of PDCP PDUs. The RLC layer is configured to perform services and functions that include the transfer of upper layer PDUs, sequence numbering, segmentation and re-segmentation.

The MAC layer is configured to perform services and functions that include mapping between logical channels (LCHs) and transport channels, multiplexing and demultiplexing of MAC SDUs, and logical channel prioritization. A single logical channel may be mapped to one or more numerologies and/or TTI durations. For example, in LCP, the MAC layer (e.g., one MAC entity of the layer) determines a TTI duration or numerology from the physical layer.

The MAC layer provides services to the RLC layer in the form of logical channels. A logical channel is defined by the type of data/information it carries and is generally referred to as a control channel and used from transmission of control and/or configuration or as a traffic channel used for user data.

The PHY layer is configured to perform services and functions that include mapping between transport channels and physical channels.

Referring to FIGS. 5C and 5D, two example user plane stacks are illustrated. FIG. 5C depicts a user plane stack of a UE 115 for operating in a multi-TRP carrier aggregation mode, and FIG. 5D depicts a user plane stack of a UE 115 for operating in a multi-TRP carrier dual connectivity mode.

Referring to FIG. 5C, user plane stack includes a SDAP entity 512, a PDCP entity 522, a first RLC entity 532, a second RLC entity 534, and a MAC entity 542. The MAC entity includes a scheduler 552 and two HARQ entities 562, 564.

During operation, the SDAP entity 512 generates a PDCP SDU 580 and transmits the PDCP SDU 580 to the PDCP entity 522. The PDCP entity 522 generates a PDCP header 590 and combines the PDCP header 590 and the PDCP SDU 580 to generate a first PDCP PDU 592. The PDCP entity 522 duplicates the first PDCP PDU 592 to generate the second PDCP PDU 594. The PDCP entity 522 transmits the two PDCP PDUs 592, 594 to corresponding RLC entities 532, 534. The RLC entities 532, 534 may perform RLC operations on the PDCP PDUs 592, 594, such as add corresponding RLC headers. The RLC 532, 534 entities transport the PDCP PDUs 592, 594 (e.g., RLC modified PDCP PDUs) to the MAC entity 542.

The scheduler 552 determines in which uplink grant to send each PDCP PDU 592, 594. For example, the scheduler 552 receives two uplink grants and determines to send the first PDCP PDU 592 in the first uplink grant and the second PDCP PDU 594 in the second uplink grant. The scheduler 552 may perform LCP mapping procedure using LCP mapping restrictions. In some such implementations, the scheduler 552 may perform enhanced LCP mapping or use "enhanced" LCP mapping restrictions, e.g., additional and/or alternative LCP mapping restrictions as compared to the LCP mapping restrictions of Sections 38.321 and/or 38.331 of Release 15. As illustrated in FIG. 5C, the first PDCP PDU 592 is sent to a first HARQ entity 562 for a first component carrier (CC1) and the second PDCP PDU 594 is sent to a second HARQ entity 564 for a second component carrier (CC2).

Referring to FIG. 5D, user plane stack includes a main stack 502 and a secondary stack 504. The main stack 502 corresponds to a first network entity, such as a main base station, such as 105a, and the secondary stack 504 corresponds to a secondary base station, such as 105b. The main stack 502 includes SDAP entity 512, a PDCP entity 522, a first RLC entity 532, and a first MAC entity 542. The secondary stack includes a second RLC entity 534, and a second MAC entity 544. The MAC entities 542, 544 may include a scheduler and/or a HARQ entity, similar to MAC entity 542 of FIG. 5C, such as 552 and/or 562.

During operation, the SDAP entity 512 of the main stack 502 generates a PDCP SDU 580 and transmits the PDCP SDU 580 to the PDCP entity 522 of the main stack 502. The PDCP entity 522 generates a PDCP header 590 and combines the PDCP header 590 and the PDCP SDU 580 to generate a first PDCP PDU 592. The PDCP entity 522 duplicates the first PDCP PDU 592 to generate the second PDCP PDU 594. The PDCP entity 522 transmits the two PDCP PDUs 592, 594 to corresponding RLC entities 532, 534 of the main stack 502 and secondary stack 504 respectively. The RLC entities 532, 534 may perform RLC operations on the PDCP PDUs 592, 594, such as add corresponding RLC headers. The RLC 532, 534 entities transport the PDCP PDUs 592, 594 (e.g., RLC modified PDCP PDUs) to corresponding MAC entities 542, 544 of the main stack 502 and secondary stack 504 respectively. Each of the MAC entities 542 and 544 (e.g., a corresponding scheduler 552 thereof) may perform MAC layer functions, such as LCP operations and LCP mappings as described with reference to FIG. 5C. An illustration of receiving uplink grants and transmission of data, such as PDCP PDU duplicated data, is illustrated in FIGS. 6A and 6B.

Figure 6B:
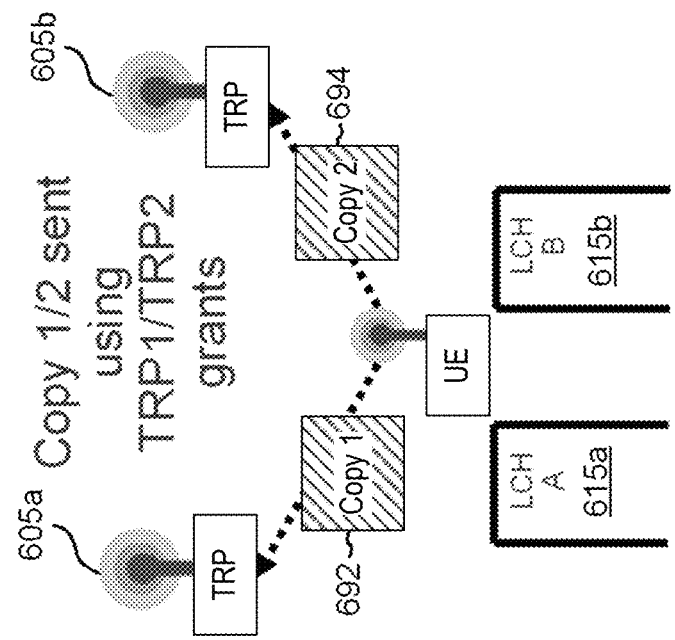
FIGS. 6A and 6B are diagrams illustrating uplink and downlink diagrams for duplication and LCP for multi-TRP schemes in accordance with aspects of the present disclosure.
Figure 6A:
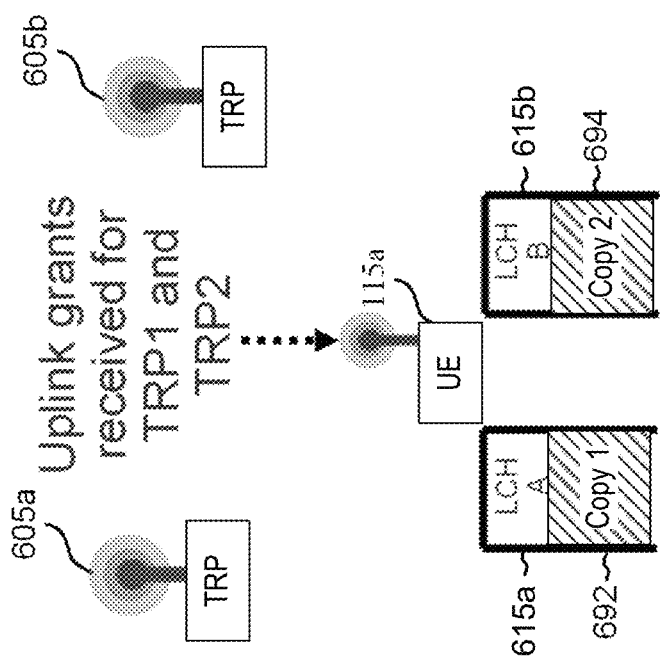

Referring to FIGS. 6A and 6B, an example of PDCP PDU duplication is illustrated. FIG. 6A illustrates an example downlink operation and FIG. 6B illustrates an example uplink operation. Referring to FIG. 6A, a system 600 include a first transmission reception point (TRP) 605a and a second TRP 605b. As described above, the first TRP 605a and the second TRP 605b have spatial diversity (i.e., do not correspond to the same antenna equipment) and may be incorporated in the same base station (same or different panel thereof) or in different base stations. Said another way, the UE 115a may be operating in a carrier aggregation multi-TRP mode or a dual connectivity multi-TRP mode.

In FIG. 6A, the UE 115a receives a downlink message or messages (e.g., one or more DCI, RRC, MAC CE, etc.) indicating uplink grants. The uplink grant or grants may include or correspond to dynamic grants, a configured grant, or multiple configured grants. When multiple downlink messages are used, the messages may be transmitted by the first TRP 605a, the second TRP 605b, or both TRPs 605a and 605b.

The UE 115a may perform the PDCP PDU duplication described with reference to FIGS. 5C and 5D, to generate first and second copies 692, 694. Additionally, the UE 115a performs the enhanced LCP mapping described with reference to FIGS. 5C and 5D, to assign or map the first copy 692 to a first logical channel 615a and the second copy 694 to a second logical channel 615b. In FIG. 6A, the UE 115a may determine that the first logical channel 615a is restricted to send data to first TRP 605a (e.g., first TRP 605 a uplink grants) and that the second logical channel 615b is restricted to send data to second TRP 605b (e.g., TRP 605b uplink grants).

Referring to FIG. 6B, the uplink transmission of the first and second copies 692 and 694 is depicted. In FIG. 6B, the UE 115a transmits the first copy 692 to the first TRP 605a using the uplink grant for the first TRP 605a and transmits the second copy 694 to the second TRP 605b using the uplink grant for the second TRP 605b. The UE 115a may transmit each copy 692, 694 with different transmission parameters, and the transmission parameters may be suited for reception by each corresponding TRP. To illustrate, the transmission parameters (e.g., transmission parameters which correspond to reception by the TRP) may enable reception or enhanced reception by the corresponding TRP. Such transmission parameters include beam parameters, spatial filtering parameters, etc., or a combination thereof. Accordingly, the UE 115a can transmit data (e.g., duplicated data) to two TRPs using the same carrier (e.g., physical medium).

Figure 7:
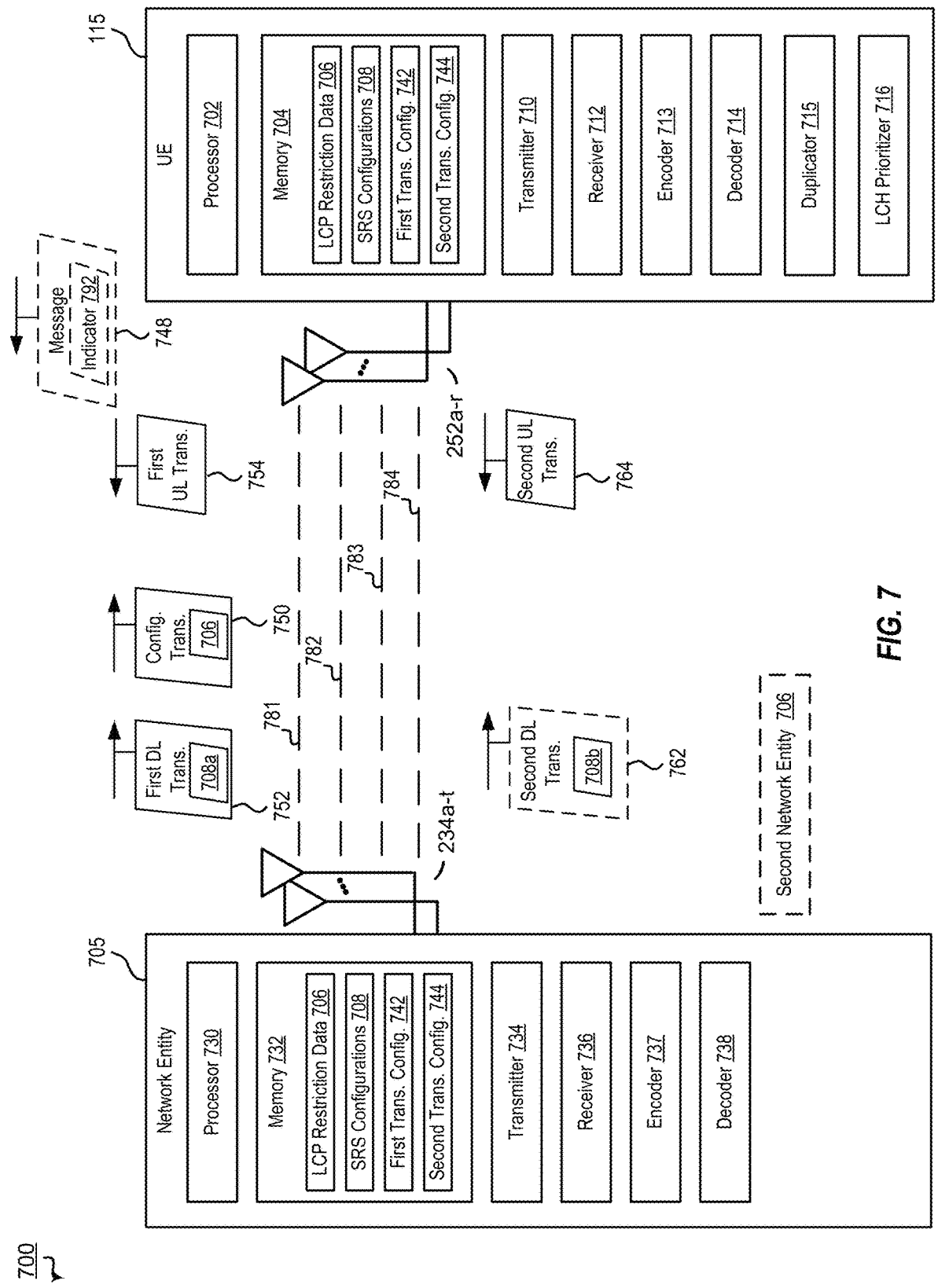
FIG. 7 is a block diagram illustrating an example of a wireless communications system that enables enhanced LCP mapping restrictions in accordance with aspects of the present disclosure.

FIG. 7 illustrates an example of a wireless communications system 700 that supports enhanced LCP mapping restrictions in accordance with aspects of the present disclosure. In some examples, wireless communications system 700 may implement aspects of wireless communication system 100. For example, wireless communications system 700 may include network entity 705 (e.g., base station 105), UE 115, and optionally second network entity 706 (e.g., second base station 105). Enhanced LCP mapping restrictions may enable reduced overhead and latency when processing duplications and thus may increase throughput and reduce latency. Such increased throughput and reduced latency may enable URLLC and may be utilized to increase reliability, and possibly throughput when interference or blockage is present between a UE and a particular TRP.

Network entity 705 and UE 115 may be configured to communicate via frequency bands, such as FR1 having a frequency of 450 to 6000 MHz for Sub-6 GHz or FR2 having a frequency of 24250 to 26000 MHz for mm-Wave. It is noted that sub-carrier spacing (SCS) may be equal to 15, 30, 60, or 120 kHz for some data channels. Network entity 705 and UE 115 may be configured to communicate via one or more component carriers (CCs), such as representative first CC 781, second CC 782, third CC 783, and fourth CC 784. Although four CCs are shown, this is for illustration only, more or fewer than four CCs may be used. One or more CCs may be used to communicate a Physical Downlink Control Channel (PDCCH), a Physical Downlink Shared Channel (PDSCH), a Physical Uplink Control Channel (PUCCH), or a Physical Uplink Shared Channel (PUSCH). In some implementations, such transmissions may be scheduled by one or more periodic grants and may correspond to configured grants of the one or more periodic grants.

Each periodic grant may have a corresponding configuration, such as configuration parameters/settings. The periodic grant configuration may include configured grant (CG) configurations and settings. Additionally, or alternatively, one or more periodic grants (e.g., CGs thereof) may have or be assigned to a CC ID, such as intended CC ID.

Each CC may have a corresponding configuration, such as configuration parameters/settings. The configuration may include bandwidth, bandwidth part, HARQ process, TCI state, RS, control channel resources, data channel resources, or a combination thereof. Additionally, or alternatively, one or more CCs may have or be assigned to a Cell ID, a Bandwidth Part (BWP) ID, or both. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC may also have corresponding management functionalities, such as, beam management, BWP switching functionality, or both.

In some implementations, two or more CCs are quasi co-located, such that the CCs have the same beam and/or same symbol. Additionally, or alternatively, CCs may be grouped as a set of one or more CCs, such as a cross carrier CORESET. Each CC in a CORESET may have the same cell ID, the same HARQ ID, or both.

In some implementations, control information may be communicated via network entity 705 and UE 115. For example, the control information may be communicated using MAC-CE transmissions, RRC transmissions, DCI, transmissions, another transmission, or a combination thereof.

UE 115 includes processor 702, memory 704, transmitter 710, receiver 712, encoder, 713, decoder 714, combiner 715, and antennas 252*a-r*. Processor 702 may be configured to execute instructions stored at memory 704 to perform the operations described herein. In some implementations, processor 702 includes or corresponds to controller/processor 280, and memory 704 includes or corresponds to memory 282. Memory 704 may also be configured to store LCP restriction data 706, SRS configurations 708, first transmission configurations 742, second transmission configurations 744, or a combination thereof, as further described herein.

The LCP restriction data 706 may include or correspond to one or more LCP restrictions, such as LCP restrictions for multi-TRP modes. In a particular implementations, the LCP restriction data 706 include SRS configurations 708. The LCP restriction data 706 may be transmitted by MAC-CE, DCI, or RRC message. The SRS configurations may include a set of all enabled or allowed SRS configurations for a particular logical channel, for multiple logical channels, or for all logical channels. In a particular implementation, the SRS configurations include a set of enabled or allowed SRS configurations for one or more logical channels. An SRS configuration for a particular transmission or transmissions may be indicated in an uplink grant.

Each uplink grant configuration may have a corresponding transmission configuration and/or transmission parameters. As illustrated in FIG. 7, UE 115 stores a first transmission configuration 742 and a second transmission configuration 744. The first transmission configuration 742 may include or correspond to first transmission parameters for (e.g., suited for reception by) a first TRP and the second transmission configuration 744 may include or correspond to second transmission parameters for (e.g., suited for reception by) a first TRP. To illustrate, the transmission parameters may include scheduling information such as when and where to send. As another illustration, the transmission parameters may include the transmission and/or reception characteristics for transmitting/receiving, such as BWP ID, beam sweep enabled, beam sweep pattern, etc., i.e., how to send.

Transmitter 710 is configured to transmit data to one or more other devices, and receiver 712 is configured to receive data from one or more other devices. For example, transmitter 710 may transmit data, and receiver 712 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 710 and receiver 712 may be replaced with a transceiver. Additionally, or alternatively, transmitter 710, receiver, 712, or both may include or correspond to one or more components of UE 115 described with reference to FIG. 2.

Encoder 713 and decoder 714 may be configured to encode and decode, such as jointly encode and jointly decode, respectively. Duplicator 715 may be configured to duplicate data, such as PDCP PDUs, for encoding by encoder 713. LCH Prioritizer 716 may be configured to select a logical channel based on LCP mapping restrictions and/or rules (e.g., LCP logic).

Network entity 705 includes processor 730, memory 732, transmitter 734, receiver 736, encoder 737, decoder 738, combiner 739, and antennas 234*a-t*. Processor 730 may be configured to execute instructions stores at memory 732 to perform the operations described herein. In some implementations, processor 730 includes or corresponds to controller/processor 240, and memory 732 includes or corresponds to memory 242. Memory 732 may be configured to store LCP restriction data 706, SRS configurations 708, first transmission configurations 742, second transmission configurations 744, or a combination thereof, similar to the UE 115 and as further described herein.

Transmitter 734 is configured to transmit data to one or more other devices, and receiver 736 is configured to receive data from one or more other devices. For example, transmitter 734 may transmit data, and receiver 736 may receive data, via a network, such as a wired network, a wireless network, or a combination thereof. For example, network entity 705 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 734 and receiver 736 may be replaced with a transceiver. Additionally, or alternatively, transmitter 734, receiver, 736, or both may include or correspond to one or more components of network entity 705 described with reference to FIG. 2. Encoder 737, decoder 738, and combiner 739 may include the same functionality as described with reference to encoder 713, and decoder 714, respectively.

During operation of wireless communications system 700, network entity 705 may determine that UE 115 has enhanced LCP mapping restriction capability, such as SRS based LCP mapping. For example, UE 115 may transmit a message 748 that includes an enhanced LCP mapping restriction capability indicator 792. Indicator 792 may indicate enhanced LCP mapping capability or a particular type of enhanced LCP mapping capability, such as enhanced LCP mapping for duplications, for multi-TRP modes, or with a particular type of LCP restriction (e.g., SRS). In some implementations, network entity 705 sends control information to indicate to UE 115 that enhanced LCP mapping restriction is to be used. For example, in some implementations, message 748 (or another message, such as response or trigger message) is transmitted by the network entity 705.

Network entity 705 transmits LCP configuration transmission 750 (e.g., a RRC or MAC CE) to UE 115. LCP configuration transmission 750 includes LCP restriction data 706, such as an enhanced LCP mapping restriction. In a particular implementation, the LCP restriction data include or corresponds to a set of enabled or allowed SRS configurations for a logical channel or channels. UE 115 receives the LCP configuration transmission 750 and updates its stored LCP restriction data 706 based on the LCP restriction data 706 of LCP configuration transmission 750.

After transmission of the message 748 (e.g., a configuration message, such as a RRC message or a MAC CE) and/or LCP configuration transmission 750, transmissions may be scheduled by the network entity 705, the UE 115, or both. Such scheduled transmissions may include shared channel transmissions, such as PUSCH transmissions. These scheduled transmissions may include or correspond to dynamic or periodically scheduled uplink transmissions. A dynamic grant may schedule a single uplink grant or uplink grant instance, and a periodic grant may schedule a single configured grant and multiple uplink grant instances. The uplink grants may include or correspond to DCI, RRC, or MAC CE.

In the example of FIG. 7, network entity 705 transmits a first downlink transmission 752 to UE 115. The first downlink transmission 752 includes a logical channel indicator and/or transmission indicator, such as a first particular SRS configuration 708a for a corresponding uplink grant or uplink grant instance. The uplink grant may include or correspond to a particular TRP. UE 115 determines a logical channel based at least on the first particular SRS configuration 708a and the updated LCP restriction data 706. For example, LCP Prioritizer 716 performs LCP mapping operations and determines the logical channel for a first uplink transmission 754 based at least on the first particular SRS configuration 708a and the updated LCP restriction data 706. In some implementations, UE 115 determines a second logical channel based at least on a second particular SRS configuration 708b (included in 752) and the updated LCP restriction data 706. For example, in such implementations first downlink transmission 752 includes two uplink grants and LCP Prioritizer 716 performs LCP mapping operations and determines the second logical channel for a second uplink transmission 764 corresponding to a second TRP based at least on the second particular SRS configuration 708b and the updated LCP restriction data 706.

Network entity 705 may transmit a second downlink transmission 762 to UE 115 in other implementations; the second downlink transmission 762 includes a second particular SRS configuration 708b for a second uplink grant associated with a second TRP. In such implementations, UE 115 determines a second logical channel based at least on the second particular SRS configuration 708b (included in 762) and the updated LCP restriction data 706. For example, LCP Prioritizer 716 performs LCP mapping operations and determines the second logical channel for the second uplink transmission 764 based at least on the second particular SRS configuration 708b and the updated LCP restriction data 706.

After the UE 115 performs logical channel prioritization operations to determine logical channels for the uplink grants, the UE 115 schedules the transmissions. In the example of FIG. 7, the UE 115 schedules the first uplink transmission 754 and the second uplink transmission 764 using the first and second logical channels respectively. The UE 115 may transmit the transmissions 754, 764 via the same carrier. For example, the UE 115 may transmit the transmissions 754, 764 on the same carrier using different transmission configurations 742, 744 which are suited for reception by correspond TRPs. Thus, the UE 115 may transmit the transmissions 754, 764 via the same carrier (e.g., simultaneously or concurrently, such as partially concurrently) to two different TRPs, even when duplicated data is being transmitted. In some implementations, UE 115 duplicates at least a portion of transmissions 754, 764. For example, UE 115 may perform PDCP PDU duplication as described in FIGS. 5C and 5D.

Thus, FIG. 7 describes enhanced LCP mapping restrictions for a UE. Using enhanced LCP mapping may enable improvement in multi-TRP modes and/or when duplicating data for transmission. Performing LCP operations with enhanced LCP mapping restrictions enables a network to reduce latency and improve reliability. Improving performance may improve throughput for communications on the network and enable use of mm wave frequency ranges and URLLC modes.

Referring to FIGS. 8A-8F, examples of messages and fields which may include an LCP configuration are illustrated. FIG. 8A is an example of a block diagram of an exemplary field layout of a downlink control message. FIGS. 8B-8F are examples of different configurations of a particular field of the downlink control message of FIG. 8A.

Referring to FIG. 8A, an example of a field layout of a downlink control message 800 is illustrated. The downlink control message 800 may include or correspond to a downlink transmission (e.g., 752 and/or 762) of FIG. 7. The downlink control message 800 includes one or more fields. As illustrated in FIG. 8A, the downlink control message 800 is a DCI. A DCI (or DCI message) may have multiple different types or formats, such as Format 0_0, 0_1, 1_0, 1_1, etc. In the example illustrated in FIG. 8A, the downlink control message 800 includes one or more first fields 812, a value field 814, and one or more second fields 816. Although three fields are illustrated in FIG. 8A, DCI 800 may include more than three fields or fewer than three fields.

The value field 814 may indicate a value for SRI, a value for SSB (Synchronization Signal Block), a value for RS (e.g., NZP-CSI-RS), a value for TCI state, or a combination thereof, for a corresponding transmission. For example, the value field 814 indicates values for SRI and RV for a corresponding transmission. The value indicated by the value field 814 may be used for LCP, such as for enhanced LCP restrictions. In a particular implementation, the value field 814 is a multi-bit field. In the implementations described herein, the values (or a sequence thereof) of the value field 814 for the transmission can be repurposed to identify values for a different parameter, as illustrated in FIGS. 8B-8F. Additionally or alternatively, value field 814 may be a first field or a last field. Although fields are described in FIG. 8A, the value us.

Referring to FIGS. 8B-8F, examples of value fields 814 are illustrated. In FIGS. 8B-8F, the value field 814 includes or corresponds to an SRI field 820, and may indicate a value for SRI, a value for SRS, a value for SSB, a value for RS, a value for TCI state, or a combination thereof for a corresponding transmission. In FIG. 8B, the SRI field 820 indicates a value for SRI for a corresponding transmission, SRI value 832. In a particular implementation, the SRI field 820 is a multi-bit field. In the implementations described herein, the values (or a sequence thereof) of the SRI field 820 can be repurposed to identify values for other parameters, as illustrated in FIGS. 8C-8F.

In FIG. 8C, an SRI field 822 includes or indicates an SSB value 834. In FIG. 8D, an SRI field 824 includes or indicates an NZP-CSI-RS value 836. In FIG. 8E, an SRI field 826 includes or indicates an SSB value 834, which indicates a TCI value 842, such as a TCI state value. In FIG. 8F, an SRI field 828 includes or indicates an NZP-CSI-RS value 836, which indicates a TCI value 842, such as a TCI state value.

The SRI field (e.g., 822-828) may indicate a value, such as a value(s) for the SRS, directly. For example, a value of the SRI field, i.e., a value identified by bits thereof, is or indicates the value for one or more of the SRI values for the corresponding transmission(s). To illustrate, a bit of the SRI field Corresponds to a SRI value for a particular transmission.

Alternatively, the SRI field may indicate a value indirectly, i.e., identify the value by indicating a member of set. For example, a value of the SRI field, i.e., a value identified by bits thereof, indicates a particular member of a set of values, and a value (e.g., a second value) of the particular member indicates the parameter value. To illustrate, a bit sequence of 111 illustrates an $8^{th}$ member of a set. Although, a DCI implementation is illustrated in FIGS. 8A-8F, the downlink control message 800 may be a MAC CE or an RRC message. In such implementations, the downlink control message 800 may include an SRI field in the alternative to the SRI field.

Figures 9, 10:
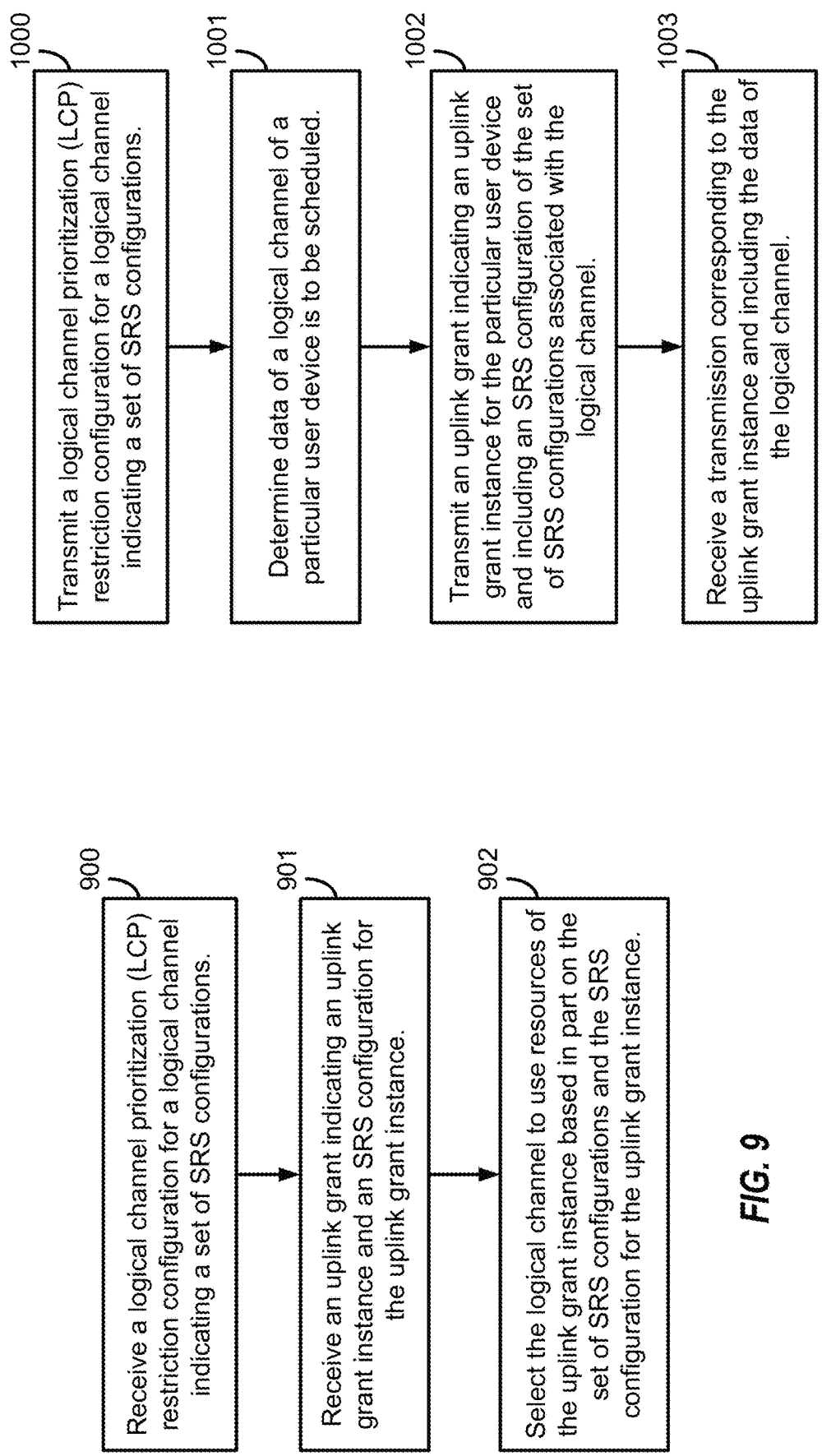
FIG. 9 is a block diagram illustrating example blocks executed by a UE configured according to an aspect of the present disclosure.
FIG. 10 is a block diagram illustrating example blocks executed by a base station configured according to an aspect of the present disclosure.
Figure 11:
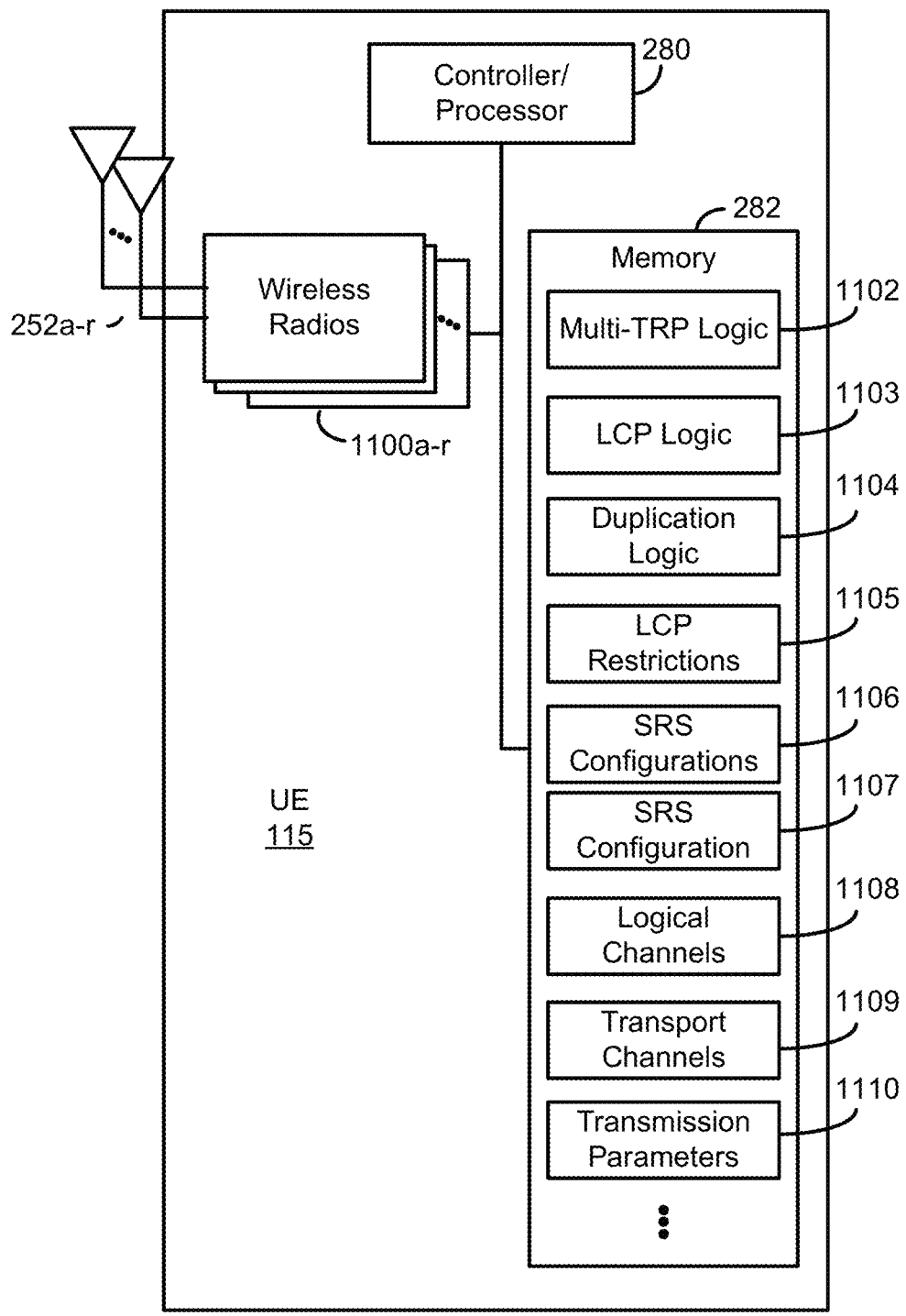
FIG. 11 is a block diagram conceptually illustrating a design of a UE according to some embodiments of the present disclosure.

FIG. 9 is a block diagram illustrating example blocks executed by a UE configured according to an aspect of the present disclosure. The example blocks will also be described with respect to UE 115 as illustrated in FIG. 11. FIG. 11 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1100a-r and antennas 252a-r. Wireless radios 1100a-r includes various components and hardware, as illustrated in FIG. 2 for UE 115, including modulator/demodulators 254a-r, MIMO detector 256, receive processor 258, transmit processor 264, and TX MIMO processor 266. As illustrated in the example of FIG. 11, memory 282 stores Multi-TRP logic 1102, LCP logic 1103, duplication logic 1104, LCP restrictions data 1105, SRS configurations data 1106 (e.g., allowed SRS configurations), SRS configuration data 1107, logical channel data 1108, and transport channels data 1109, and transmission parameter data 1110.

At block 900, a mobile communication device, such as a UE, receives a logical channel prioritization (LCP) restriction configuration for a logical channel indicating a set of SRS configurations. A UE, such as UE 115, receives a downlink transmission (e.g., first downlink transmission, such as a DCI, RRC, MAC CE) via wireless radios 1100a-r and antennas 252a-r. The downlink transmission (e.g., 750) includes a LCP restriction (e.g., 706) for at least one logical channel. The LCP restriction may be SRS/SRI based, such as may indicate a set of allowable SRS/SRI configurations (e.g., 708).

The UE 115 may execute, under control of controller/processor 280, Multi-TRP logic 1102, stored in memory 282. The execution environment of Multi-TRP logic 1102 provides the functionality for UE 115 to define and perform the Multi-TRP procedures. Additionally, the UE 115 may execute one or more of LCP logic 1103 and or duplication logic 1104. The execution environment of Multi-TRP logic 1102 (and optionally LCP logic 1103 and/or duplication logic 1104) defines the different Multi-TRP processes, such as determining a Multi-TRP mode, determining an LCP mode, determining enhanced LCP restrictions, updating LCP restrictions, selecting a logical channel, duplicating data, etc. To illustrate, UE 115 may store/update LCP restrictions data 1105 based on the received LCP restriction and/or may store/update the allowed SRS configurations 1106 based on the received set of allowable SRS/SRI configurations. Additionally, UE 115 may send an acknowledgement message responsive to the downlink transmission to indicate successful reception and decoding of the downlink transmission.

At block 901, the UE 115 receives an uplink grant indicating an uplink grant instance and an SRS configuration for the uplink grant instance. The UE 115 receives an uplink grant (e.g., second downlink transmission) via wireless radios 1100a-r and antennas 252a-r. The uplink grant may indicate or include one or more uplink grant instances for a particular TRP, and may indicate a corresponding SRS configuration 1107 (e.g., 708a, 708b) for the uplink grant instance(s) and the particular TRP.

In some implementations, the uplink grant is a periodic grant. In other implementations, another uplink grant is received that includes or is a periodic grant. In such periodic grant implementations, the UE 115, may execute, under control of controller/processor 280, periodic grant logic, stored in memory 282. The execution environment of the periodic grant logic defines the different periodic grant processes, such as determining a periodic grant configuration, configured grant configurations and/or scheduling uplink grants. The UE 115 may schedule or determine a schedule for an upcoming uplink transmission based on the periodic grant, and may transmit such downlink transmissions using antennas 252*a-r* and wireless radios 1100*a-r*.

At block 902, the UE 115 selects the logical channel to use resources of the uplink grant instance based in part on the set of SRS configurations and the SRS configuration for the uplink grant instance. The UE 115 selects a logical channel from a plurality of logical channels based on the enhanced LCP mapping restrictions and the indication in the uplink grant (e.g., SRS/SRI based indication). For example, the execution environment of the Multi-TRP logic 1102 (and optionally LCP logic 1103 and/or duplication logic 1104) provides UE 115 the functionalities described with respect to the various aspects of the present disclosure, such as performing LCP operations. To illustrate, within the execution environment of Multi-TRP logic 1102 (and optionally LCP logic 1103), UE 115, under control of controller/processor 280, may determine a particular logical channel of the logical channels indicated by logical channel data 1108 based on LCP restrictions 1105, SRS configurations 1106, and SRS configuration 1107.

As an illustrative example, UE 115 selects the logical channel by determining the SRS configuration of the uplink grant instance based on a value of an SRS resource indicator field associated with the uplink grant instance, and determining the logical channel to use the resources of the uplink grant instance based on the value of the SRS resource indicator field associated with the uplink grant instance. As another illustrative example, UE 115 determines possible logical channels of a plurality of logical channels for the uplink grant instance by determining useable logical channels of the plurality of logical channels for the uplink grant instance based on a corresponding set of SRS configurations associated with each logical channel of the plurality of logical channels, and the plurality of logical channels including the logical channel, determining non-useable logical channels of the plurality of logical channels for the uplink grant instance based on LCP mapping restrictions (e.g., generic or conventional LCP mappings restrictions, such as non SRS/SRI LCP mapping restrictions, or both.

The UE 115 may execute additional blocks (or the UE 115 may be configured further perform additional operations) in other implementations. For example, the UE 115 may transmit data of the selected logical channel, send an acknowledgment for the uplink grant, or a combination thereof, after block 902. As another example, the UE 115 may duplicate the data of the selected logical channel to generate second data, perform second LCP mapping for the second data to determine a second logical channel, and transmit the second data of the second logical channel. In a particular implementation, that data is sent to a first TRP and the duplicated data is sent to a second TRP using the same carrier, as described with reference to FIGS. 5C, 5D, and 6B. As an additional example, the UE 115 may perform one or more operations described above. As yet another example, the UE 115 may perform one or more aspects as described below.

In a first aspect, the UE 115 transmits data via the selected logical channel, where the set of SRS configurations associated with the logical channel is a subset of a set of allowed SRS configurations for a plurality of logical channels including the logical channel.

In a second aspect, alone or in combination with one or more of the above aspects, selecting the logical channel to use resources of the uplink grant instance based in part on the set of SRS configurations and the SRS configuration includes: the UE 115 determining the SRS configuration for the uplink grant instance based on a value of an SRS resource indicator field associated with the uplink grant instance, and determining the logical channel to use the resources of the uplink grant instance based on the value of the SRS resource indicator field associated with the uplink grant instance.

In a third aspect, alone or in combination with one or more of the above aspects, determining the logical channel to use resources of the uplink grant instance based on the value of the SRS resource indicator field includes: the UE 115 determining possible logical channels of a plurality of logical channels for the uplink grant instance based on LCP mapping restrictions, and determining the logical channel to use resources of the uplink grant instance from the possible logical channels based on the value of the SRS resource indicator field.

In a fourth aspect, alone or in combination with one or more of the above aspects, determining possible logical channels of a plurality of logical channels for the uplink grant instance includes: the UE 115 determining useable logical channels of the plurality of logical channels for the uplink grant instance based on a corresponding set of SRS configurations associated with each logical channel of the plurality of logical channels, and the plurality of logical channels including the logical channel; determining non-useable logical channels of the plurality of logical channels for the uplink grant instance based on LCP mapping restrictions; or both.

In a fifth aspect, alone or in combination with one or more of the above aspects, the UE 115 transmits data via the selected logical channel, wherein the set of SRS configurations associated with the logical channel is a subset of a set of allowed SRS configurations for a plurality of logical channels including the logical channel, duplicates a PDCP PDU to generate a second PDCP PDU, wherein the PDCP PDU corresponds to the data transmitted via the selected logical channel; receives a second uplink grant indicating a second uplink grant instance and a second SRS configuration for the second uplink grant instance; selects a second logical channel to use resources of the second uplink grant instance based on the set of allowed SRS configurations and the second SRS configuration, and transmits second data via the selected second logical channel, the second data including the second PDCP PDU.

In a sixth aspect, alone or in combination with one or more of the above aspects, the uplink grant further indicates a second uplink grant instance, and the UE 115 further transmits data via the selected logical channel, wherein the set of SRS configurations associated with the logical channel is a subset of a set of allowed SRS configurations for a plurality of logical channels including the logical channel, duplicates a PDCP PDU to generate a second PDCP PDU, wherein the PDCP PDU corresponds to the data transmitted via the selected logical channel, selects a second logical channel to use resources of the second uplink grant instance based on the set of allowed SRS configurations and a second SRS configuration for the second uplink grant instance, and transmits second data via the selected logical channel, the second data including the second PDCP PDU.

In a seventh aspect, alone or in combination with one or more of the above aspects, the SRS configuration for the uplink grant instance indicates a SRS indicator value.

In an eighth aspect, alone or in combination with one or more of the above aspects, the SRS configuration for the uplink grant instance indicates an SSB value.

In a ninth aspect, alone or in combination with one or more of the above aspects, the SRS configuration for the uplink grant instance indicates an NZP-CSI-RS-Resource value.

In a tenth aspect, alone or in combination with one or more of the above aspects, the SRS configuration indicates a TCI indication, and wherein the TCI indication comprises a TCI state indication of a SSB or a NZP-CSI-RS-Resource.

In an eleventh aspect, alone or in combination with one or more of the above aspects, the LCP restriction configuration is included in a DCI, a MAC CE, or an RRC message.

In a thirteenth aspect, alone or in combination with one or more of the above aspects, the uplink grant comprises a dynamic grant, and wherein the uplink grant comprises a DCI.

In a fourteenth aspect, alone or in combination with one or more of the above aspects, the uplink grant comprises a configured grant, and wherein the uplink grant comprises one or more of a DCI or an RRC message.

In a fifteenth aspect, alone or in combination with one or more of the above aspects, the UE 115 transmits a message including an SRS signal, wherein an SRI field of the LCP restriction configuration is generated based on the SRS signal.

Accordingly, a UE and a base station may perform enhanced LCP mapping for Multi-TRP modes. By performing enhanced LCP mapping for Multi-TRPs, additional functionality can be achieved, such as duplicated data can be sent to two different TRPs using the same carrier. Consequently, latency and overhead may be reduced and throughput and reliability may be increased.

Figure 12:
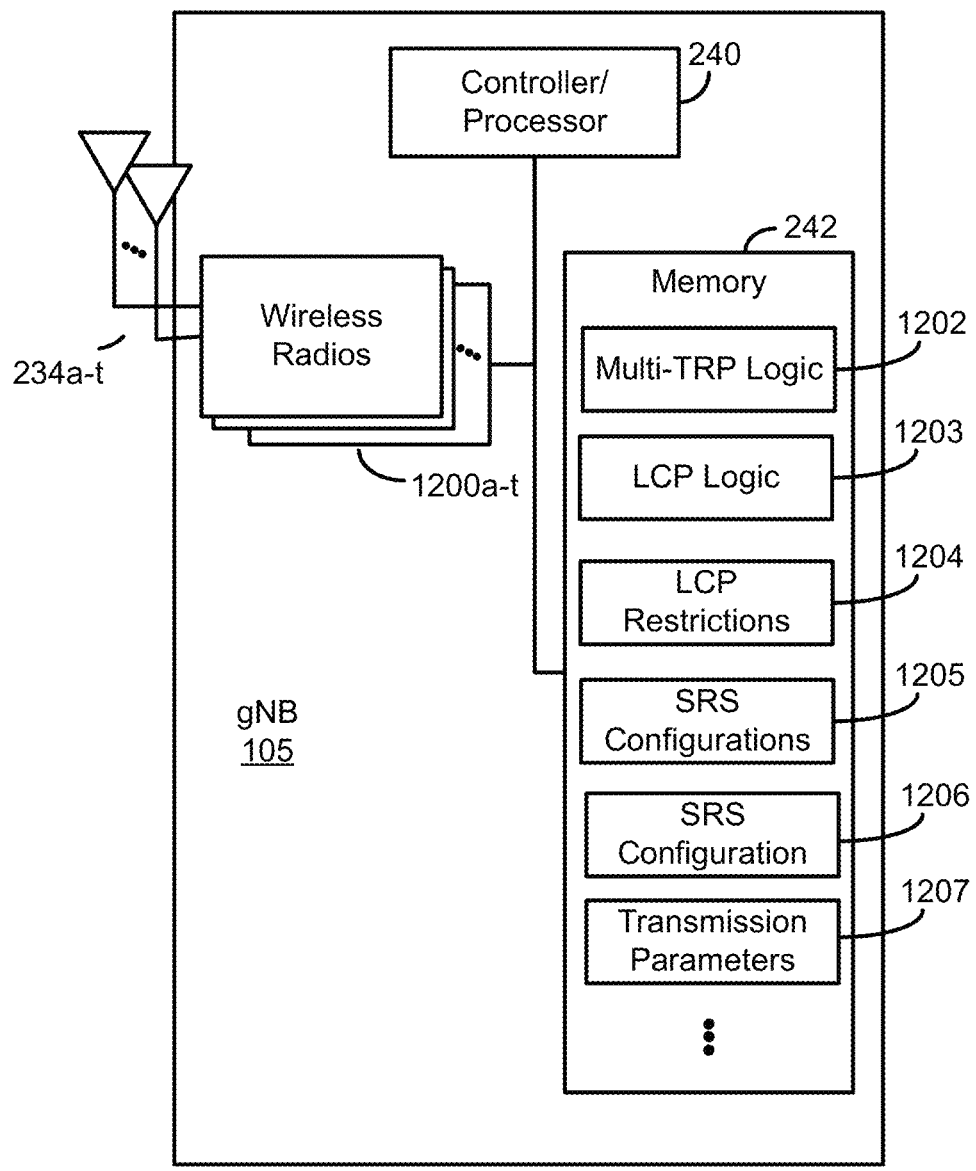
FIG. 12 is a block diagram conceptually illustrating a design of a base station configured according to some embodiments of the present disclosure.

FIG. 10 is a block diagram illustrating example blocks executed by a base station configured according to an aspect of the present disclosure. The example blocks will also be described with respect to gNB 105 (or eNB) as illustrated in FIG. 12. FIG. 12 is a block diagram illustrating gNB 105 configured according to one aspect of the present disclosure. The gNB 105 includes the structure, hardware, and components as illustrated for gNB 105 of FIG. 2. For example, gNB 105 includes controller/processor 240, which operates to execute logic or computer instructions stored in memory 242, as well as controlling the components of gNB 105 that provide the features and functionality of gNB 105. The gNB 105, under control of controller/processor 240, transmits and receives signals via wireless radios 1200a-t and antennas 234a-r. Wireless radios 1200a-t includes various components and hardware, as illustrated in FIG. 2 for gNB 105, including modulator/demodulators 232a-t, MIMO detector 236, receive processor 238, transmit processor 220, and TX MIMO processor 230. The data 1202-1207 in memory 242 may include or correspond to the corresponding data 1102-1110 in memory 282, respectively.

At block 1000, a network entity, such as a gNB, transmits a logical channel prioritization (LCP) restriction configuration for a logical channel indicating a set of SRS configurations. A gNB, such as gNB 105, may execute, under control of controller/processor 240, Multi-TRP logic 1202, stored in memory 242. The execution environment of Multi-TRP logic 1202 provides the functionality for gNB 105 to define and perform the Multi-TRP procedures.

The execution environment of Multi-TRP logic 1202 defines the different Multi-TRP processes, such as signaling for enhanced LCP mapping operations and indicating LCP restriction configurations. To illustrate, the gNB 105 transmits a downlink configuration message (e.g., 750) including 1204 and 1205 to the UE 115 via wireless radios 1200a-t and antennas 234a-r, such as responsive to a configuration, capabilities, or mode message (e.g., 748).

At block 1001, the gNB 105 determines data of a logical channel of a particular user device is to be scheduled. The execution environment of Multi-TRP logic 1202 provides the functionality for gNB 105 to define and perform the Multi-TRP procedures. Within the execution environment of the Multi-TRP logic 1202, gNB 105, under control of controller/processor 240, determines that the UE has data of a logical channel to be scheduled. The gNB 105 may determine that the UE has data to send responsive to receiving an uplink message. When the UE is sending data via configured grants, the gNB 105 may determine that the UE has and will have data to transmit periodically in the future.

At block 1002, the gNB 105 transmits an uplink grant indicating an uplink grant instance for the particular user device indicating an SRS configuration of the set of SRS configurations associated with the logical channel. The gNB 105 generates and transmits a downlink transmission (e.g., second downlink transmission) via antennas 234a-t and wireless radios 1200a-t. The downlink transmission may include or correspond to one of the downlink transmissions of FIG. 6A or 7, such as 752, 762. For example, the downlink transmission may include an SRS configuration 1206 (e.g., 708a, 708b, or both).

For example, the execution environment of Multi-TRP logic 1202 (and optionally LCP logic 1203) defines the different Multi-TRP (and LCP) processes, such as LCP restrictions and configurations. As gNB 105, To illustrate, within the execution environment gNB 105, under control of controller/processor 240, selects an SRS configuration 1206 from allowed SRS configurations 1205 and generates (e.g., encodes) the downlink transmissions (e.g., DCI or RRC) which includes the SRS configuration 1206.

At block 1003, the gNB 105 receives a transmission corresponding to the uplink grant instance and including the data of the logical channel. The gNB receives an uplink transmission via antennas 234a-t and wireless radios 1200a-t. The uplink transmission (e.g., 754, 764) may be configured for reception by the gNB 105 based on the SRS configuration 1206 and the LCP restrictions 1204 and allowed SRS configurations 1205. To illustrate, the uplink transmission may be associated with or sent via transmission parameters 1110 and/or 1207.

The gNB 105 (or another base station or network entity) may execute additional blocks (or the gNB 105 may be configured further perform additional operations) in other implementations. For example, the gNB 105 may perform one or more operations described above. As yet another example, the gNB 105 may perform one or more aspects as described below.

In a first aspect, the gNB 105 transmits a second LCP restriction configuration for a second logical channel indicating a second set of SRS configurations associated with the second logical channel, determines that second data of the second logical channel of the particular UE is to be scheduled, transmits a second uplink grant indicating a second uplink grant instance for the particular UE, wherein the second uplink grant instance indicates a second SRS configuration of the second set of SRS configurations associated with the second logical channel, receives a second transmission corresponding to the second uplink grant instance including the second data of the second logical channel.

In a second aspect, alone or in combination with one or more of the above aspects, the LCP restriction configuration and the second LCP restriction configuration are transmitted separately.

In a third aspect, alone or in combination with one or more of the above aspects, the LCP restriction configuration and the second LCP restriction configuration are transmitted in the same transmission.

In a fourth aspect, alone or in combination with one or more of the above aspects, a first transmission reception point receives the transmission and a second transmission reception point receives the second transmission, and wherein the transmission and the second transmission include duplicated data.

In a fifth aspect, alone or in combination with one or more of the above aspects, a first base station receives the transmission and a second base station receives the second transmission, and wherein the transmission and the second transmission include duplicated data.

In a sixth aspect, alone or in combination with one or more of the above aspects, the SRS configuration is indicated by an SRS indicator field which indicates a SRS indicator value.

In a seventh aspect, alone or in combination with one or more of the above aspects, the SRS configuration is indicated by an SRS indicator field which indicates an SSB value.

In an eighth aspect, alone or in combination with one or more of the above aspects, the SRS configuration is indicated by an SRS indicator field which indicates an NZP-CSI-RS-Resource value.

In a ninth aspect, alone or in combination with one or more of the above aspects, the SRS configuration is indicated by an SRS indicator field which indicates a TCI indication, and wherein the TCI indication comprises a TCI state indication of a SSB or a NZP-CSI-RS-Resource.

In a tenth aspect, alone or in combination with one or more of the above aspects, the LCP restriction configuration is included in a DCI, a MAC CE, or an RRC message.

In an eleventh aspect, alone or in combination with one or more of the above aspects, the uplink grant comprises a dynamic grant or a configured grant.

In a twelfth aspect, alone or in combination with one or more of the above aspects, prior to transmitting the LCP restriction configuration: the gNB 105 receives a message including an SRS signal from the UE, and generates an SRI field of the LCP restriction configuration based on the SRS signal.

Accordingly, a UE and a base station may perform enhanced LCP mapping for Multi-TRP modes. By performing enhanced LCP mapping for Multi-TRPs, additional functionality can be achieved, such as duplicated data can be sent to two different TRPs using the same carrier. Consequently, latency and overhead may be reduced and throughput and reliability may be increased.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 9 and 10 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus configured for wireless communication, the apparatus comprising:
   at least one processor; and
   a memory coupled to the at least one processor, wherein the at least one processor is configured to:
      transmit, by a network entity, a logical channel prioritization (LCP) restriction configuration for a logical channel indicating a set of Sounding Reference Signal (SRS) configurations associated with the logical channel, wherein the LCP restriction configuration enables LCP mapping of data from logical channels by the UE;
      determine, by the network entity, data of the logical channel of a particular UE is to be scheduled;
      transmit, by the network entity, an uplink grant indicating an uplink grant instance for the particular UE and an SRS configuration of the set of SRS configurations; and
      receive, by the network entity, a transmission corresponding to the uplink grant instance and including the data of the logical channel.

2. The apparatus of claim 1, wherein the SRS configuration is indicated by an SRS indicator field which indicates an SRS indicator value.

3. The apparatus of claim 1, wherein the SRS configuration is indicated by an SRS indicator field which indicates a synchronization signal block (SSB) value.

4. The apparatus of claim 1, wherein the SRS configuration is indicated by an SRS indicator field which indicates a non-zero power channel state information reference signal resource (NZP-CSI-RS-Resource) value.

5. The apparatus of claim 1, wherein the SRS configuration is indicated by an SRS indicator field which indicates a transmission configuration indicator (TCI) indication, and wherein the TCI indication comprises a TCI state indication of a synchronization signal block (SSB) or a non-zero power channel state information reference signal resource (NZP-CSI-RS-Resource).

6. The apparatus of claim 1, wherein the LCP restriction configuration is included in downlink control information (DCI), a medium access control element (MAC CE), or a radio resource control (RRC) message.

7. The apparatus of claim 1, wherein the uplink grant comprises a dynamic grant or a configured grant, and wherein the LCP restriction configuration indicates a set of allowed SRS configurations for the plurality of logical channels, including the set of SRS configurations associated with the logical channel.

8. The apparatus of claim 1, wherein, prior to transmitting the LCP restriction configuration, the at least one processor is further configured to:
   receive, by the network entity, a message including an SRS signal from the UE; and
   generate, by the network entity, an SRS resource indicator (SRI) field of the LCP restriction configuration based on the SRS signal.

9. The apparatus of claim 1, wherein the at least one processor is further configured to:
   transmit, by the network entity, a second LCP restriction configuration for a second logical channel indicating a second set of SRS configurations associated with the second logical channel;
   determine, by the network entity, that second data of the second logical channel of the particular UE is to be scheduled;
   transmit, by the network entity, a second uplink grant indicating a second uplink grant instance for the particular UE, wherein the second uplink grant instance indicates a second SRS configuration of the second set of SRS configurations associated with the second logical channel; and
   receive, by the network entity, a second transmission corresponding to the second uplink grant instance including the second data of the second logical channel.

10. The apparatus of claim 9, wherein the LCP restriction configuration and the second LCP restriction configuration are transmitted separately.

11. The apparatus of claim 9, wherein the LCP restriction configuration and the second LCP restriction configuration are transmitted in the same transmission.

12. The apparatus of claim 9, wherein the network entity corresponds to a particular base station, wherein a first transmission reception point receives the transmission and a second transmission reception point receives the second transmission, and wherein the transmission and the second transmission include duplicated data.

13. The apparatus of claim 9, wherein the network entity includes two base stations, wherein a first base station receives the transmission and a second base station receives the second transmission, and wherein the transmission and the second transmission include duplicated data.

14. The apparatus of claim 1, wherein the set of SRS configurations associated with the logical channel is a subset of a set of allowed SRS configurations for a plurality of logical channels including the logical channel.

15. The apparatus of claim 14, wherein the at least one processor is further configured to:
receive, by the network entity, second data via a second logical channel based on the set of allowed SRS configurations, the second data including a second Packet Data Convergence Protocol (PDCP) Packet Data Unit (PDU), the second PDCP PDU received based on duplication of a PDCP PDU corresponding to the data transmitted via the logical channel.

16. A method of wireless communication comprising:
transmitting, by a network entity, a logical channel prioritization (LCP) restriction configuration for a logical channel indicating a set of Sounding Reference Signal (SRS) configurations associated with the logical channel, wherein the LCP restriction configuration enables LCP mapping of data from logical channels by the UE;
determining, by the network entity, data of the logical channel of a particular UE is to be scheduled;
transmitting, by the network entity, an uplink grant indicating an uplink grant instance for the particular UE, wherein the uplink grant instance indicates an SRS configuration of the set of SRS configurations; and
receiving, by the network entity, a transmission corresponding to the uplink grant instance and including the data of the logical channel.

17. The method of claim 16, further comprising:
transmitting, by the network entity, a second LCP restriction configuration for a second logical channel indicating a second set of SRS configurations associated with the second logical channel;
determining, by the network entity, that second data of the second logical channel of the particular UE is to be scheduled;
transmitting, by the network entity, a second uplink grant indicating a second uplink grant instance for the particular UE, wherein the second uplink grant instance indicates a second SRS configuration of the second set of SRS configurations associated with the second logical channel; and
receive, by the network entity, a second transmission corresponding to the second uplink grant instance including the second data of the second logical channel.

18. The method of claim 17, wherein the LCP restriction configuration and the second LCP restriction configuration are transmitted separately.

19. The method of claim 17, wherein the LCP restriction configuration and the second LCP restriction configuration are transmitted in the same transmission.

20. The method of claim 17, wherein the network entity corresponds to a particular base station, wherein a first transmission reception point receives the transmission and a second transmission reception point receives the second transmission, and wherein the transmission and the second transmission include duplicated data.

21. The method of claim 17, wherein the network entity includes two base stations, wherein a first base station receives the transmission and a second base station receives the second transmission, and wherein the transmission and the second transmission include duplicated data.

22. The method of claim 16, wherein the SRS configuration is indicated by an SRS indicator field which indicates an SRS indicator value.

23. The method of claim 16, wherein the SRS configuration is indicated by an SRS indicator field which indicates a synchronization signal block (SSB) value.

24. The method of claim 23, wherein the SRS configuration is indicated by an SRS indicator field which indicates a non-zero power channel state information reference signal resource (NZP-CSI-RS-Resource).

25. The method of claim 23, wherein the SRS configuration is indicated by an SRS indicator field which indicates a transmission configuration indicator (TCI) indication, and wherein the TCI indication comprises a TCI state indication of a SSB or a non-zero power channel state information reference signal resource (NZP-CSI-RS-Resource).

26. The method of claim 23, wherein the LCP restriction configuration is included in a downlink control information (DCI), a medium access control element (MAC CE), or a radio resource control (RRC) message, and wherein the uplink grant comprises a dynamic grant or a configured grant.

27. The method of claim 23, further comprising, prior to transmitting the LCP restriction configuration:
receiving, by the network entity, a message including an SRS signal from the UE; and
generating, by the network entity, an SRS resource indicator (SRI) field of the LCP restriction configuration based on the SRS signal.

28. The method of claim 16, wherein the set of SRS configurations associated with the logical channel is a subset of a set of allowed SRS configurations for a plurality of logical channels including the logical channel.

29. The method of claim 28, further comprising:
receiving, by the network entity, second data via a second logical channel based on the set of allowed SRS configurations, the second data including a second Packet Data Convergence Protocol (PDCP) Packet Data Unit (PDU), the second PDCP PDU received based on duplication of a PDCP PDU corresponding to the data transmitted via the logical channel.

30. A non-transitory computer-readable medium storing instructions that, when executed by a processor, cause the processor to perform operations comprising:
transmitting, by a network entity, a logical channel prioritization (LCP) restriction configuration for a logical channel indicating a set of Sounding Reference Signal (SRS) configurations associated with the logical channel, wherein the LCP restriction configuration enables LCP mapping of data from logical channels by the UE;
determining, by the network entity, data of the logical channel of a particular UE is to be scheduled;
transmitting, by the network entity, an uplink grant indicating an uplink grant instance for the particular UE, wherein the uplink grant instance indicates an SRS configuration of the set of SRS configurations; and
receiving, by the network entity, a transmission corresponding to the uplink grant instance and including the data of the logical channel.

* * * * *